US006320897B1

(12) United States Patent
Fattouche et al.

(10) Patent No.: US 6,320,897 B1
(45) Date of Patent: *Nov. 20, 2001

(54) MULTICODE SPREAD SPECTRUM COMMUNICATIONS SYSTEM

(75) Inventors: Michel T. Fattouche; Hatim Zaghloul; Paul R. Milligan; David L. Snell, all of Calgary (CA)

(73) Assignee: Wi-LAN Inc., Calgary (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/389,394

(22) Filed: Sep. 3, 1999

Related U.S. Application Data

(63) Continuation of application No. 08/725,556, filed on Oct. 3, 1996, now Pat. No. 6,192,068.

(51) Int. Cl.[7] .................................................. H04B 15/00
(52) U.S. Cl. .......................................................... 375/130
(58) Field of Search ................................... 375/130, 140, 375/139, 146, 147, 150

(56) References Cited

U.S. PATENT DOCUMENTS

| 3,485,949 | 12/1969 | De Haas . | |
|---|---|---|---|
| 3,789,149 | 1/1974 | Clark ................................... | 370/342 |
| 3,956,619 | 5/1976 | Mundy et al. ...................... | 708/410 |

(List continued on next page.)

FOREIGN PATENT DOCUMENTS

| 1 203 576 | 4/1986 | (CA) . |
| 0 562 868 A2 | 9/1993 | (EP) . |
| 0 567 771 A2 | 11/1993 | (EP) . |
| 0 605 955 A2 A3 | 7/1994 | (EP) . |
| 2 146 875A | 4/1985 | (GB) . |

OTHER PUBLICATIONS

Scott L. Miller and Weerakhan Tantiphaiboontana, Code Division Multiplexing—Efficient Modulation for High Data Rate Transmission Over Wireless Channels, Proceedings of 2000 IEEE International Conference on Communications, pp. 1487–1491.

Shigenobu Sasaki, Jinkang Zhu, and Gen Marubayashi, Performance of Parallel Combinatory Spread Spectrum Multiple Access Communication Systems, Proceedings of 1991 IEEE International Symposium on Personal, Indoor and Mobile Radio Communications (PIMRC), pp. 204–208.

(List continued on next page.)

*Primary Examiner*—Chi Pham
*Assistant Examiner*—Khai Tran
(74) *Attorney, Agent, or Firm*—Christensen O'Connor Johnson Kindness PLLC

(57) ABSTRACT

MultiCode Spread Spectrum (MCSS) is a modulation scheme that assigns a number N of Spread Spectrum (SS) codes to an individual user where the number of chips per SS code is M. When viewed as Direct Sequence Spread Spectrum, MCSS requires up to N correlators (or equivalently up to N Matched Filters) at the receiver with a complexity of the order of NM operations. In addition, a non ideal communication channel can cause InterCode Interference (ICI), i.e. interference between the N SS codes. In this patent, we introduce three new types of MCSS. MCSS Type I allows the information in a MCSS signal to be detected using a sequence of partial corrrelations with a combined complexity of the order of M operations. MCSS Type II allows the information in a MCSS signal to be detected in a sequence of low complexity parallel operations which reduce the ICI. MCSS Type III allows the information in a MCSS signal to be detected using a filter suitable for ASIC implementation or on Digital Signal Processor, which reduces the effect of multipath. In addition to low complexity detection and reduced ICI, MCSS has the added advantage that it is spectrally efficient.

46 Claims, 22 Drawing Sheets

U.S. PATENT DOCUMENTS

| | | | |
|---|---|---|---|
| 3,987,374 | 10/1976 | Jones, Jr. . | |
| 4,092,491 | 5/1978 | Frazer . | |
| 4,164,628 | 8/1979 | Ward et al. . | |
| 4,306,308 | 12/1981 | Nossen . | |
| 4,457,004 | 6/1984 | Gersho et al. . | |
| 4,520,490 | 5/1985 | Wei . | |
| 4,601,005 | 7/1986 | Kilvington . | |
| 4,601,045 | 7/1986 | Lubarsky . | |
| 4,615,040 | 9/1986 | Mojoli et al. | 375/267 |
| 4,623,980 | 11/1986 | Vary . | |
| 4,641,318 | 2/1987 | Addeo | 375/250 |
| 4,660,215 | 4/1987 | Horiike et al. . | |
| 4,694,466 | 9/1987 | Kadin . | |
| 4,713,817 | 12/1987 | Wei . | |
| 4,731,816 | 3/1988 | Hughes-Hartogs . | |
| 4,799,214 | 1/1989 | Kaku . | |
| 4,809,299 | 2/1989 | Ho . | |
| 4,829,540 | 5/1989 | Waggener, Sr. et al. . | |
| 4,868,874 | 9/1989 | Takatori et al. . | |
| 4,881,241 | 11/1989 | Pommier et al. | 370/260 |
| 4,893,266 | 1/1990 | Deem . | |
| 4,901,307 | 2/1990 | Gilhousen et al. | 370/320 |
| 4,914,699 | 4/1990 | Dunn et al. . | |
| 4,928,310 | 5/1990 | Goutzoulis et al. . | |
| 4,933,952 | 6/1990 | Albrieux et al. . | |
| 4,944,009 | 7/1990 | Micali et al. . | |
| 4,979,183 | 12/1990 | Cowart . | |
| 5,029,180 | 7/1991 | Cowart . | |
| 5,034,911 | 7/1991 | Rachels . | |
| 5,063,560 | 11/1991 | Yerbury et al. . | |
| 5,063,574 | 11/1991 | Moose | 375/244 |
| 5,073,899 | 12/1991 | Collier et al. . | |
| 5,089,982 | 2/1992 | Gran et al. . | |
| 5,103,459 | 4/1992 | Gilhousen et al. . | |
| 5,128,964 | 7/1992 | Mallory | 375/261 |
| 5,134,464 | 7/1992 | Basile et al. | 348/487 |
| 5,151,919 | 9/1992 | Dent . | |
| 5,157,686 | 10/1992 | Omura et al. . | |
| 5,166,924 | 11/1992 | Moose | 370/289 |
| 5,166,951 | 11/1992 | Schilling | 375/145 |
| 5,193,094 | 3/1993 | Viterbi . | |
| 5,210,770 | 5/1993 | Rice . | |
| 5,228,025 | 7/1993 | Le Floch et al. . | |
| 5,235,614 | 8/1993 | Bruckert et al. . | |
| 5,268,926 | 12/1993 | Sebilet . | |
| 5,274,629 | 12/1993 | Helard et al. . | |
| 5,278,844 | 1/1994 | Murphy et al. . | |
| 5,282,222 | 1/1994 | Fattouche et al. . | |
| 5,285,474 | 2/1994 | Chow et al. . | |
| 5,291,515 | 3/1994 | Uchida et al. | 375/142 |
| 5,307,376 | 4/1994 | Castelain et al. | 375/260 |
| 5,309,474 | 5/1994 | Gilhousen et al. . | |
| 5,345,440 | 9/1994 | Gledhill et al. . | |
| 5,357,541 | 10/1994 | Cowart . | |
| 5,373,502 | 12/1994 | Turban | 370/441 |
| 5,375,140 | 12/1994 | Bustamante et al. . | |
| 5,414,734 | 5/1995 | Marchetto et al. | 375/267 |
| 5,416,797 | 5/1995 | Gilhousen et al. . | |
| 5,442,625 | 8/1995 | Gitlin et al. . | |
| 5,467,367 | 11/1995 | Izumi et al. . | |
| 5,469,469 | 11/1995 | Haines . | |
| 5,479,447 | 12/1995 | Chow et al. . | |
| 5,487,069 | 1/1996 | O'Sullivan et al. . | |
| 5,550,812 | 8/1996 | Philips . | |
| 5,555,268 * | 9/1996 | Fattouche et al. | 375/140 |
| 5,596,601 | 1/1997 | Bar-David . | |
| 5,615,209 | 3/1997 | Bottomley et al. . | |
| 5,623,511 | 4/1997 | Bar-David et al. . | |
| 5,715,236 | 2/1998 | Gilhousen et al. . | |
| 5,761,429 | 6/1998 | Thompson | 709/224 |
| 5,960,032 * | 9/1999 | Letaief et al. | 275/140 |

OTHER PUBLICATIONS

Jinkang Zhu and Gen Marubayashi, Properties and Application of Parallel Combinatory SS Communication System, IEEE Second International Symposium on Spread Spectrum Techniques and Applications (ISSSTA '92), Yokohama, Japan, pp. 227–230, Nov. 29–Dec. 2, 1992.

K. Ben Letaief, J. C–I Chuang, and R.D. Murch, Multicode High–Speed Transmission for Wireless Mobile Communications, Proceedings of the 1995 IEEE Global Telecommunications Conference GLOBECOM'95, Singapore, pp. 1835–1839, Nov. 14–16, 1995.

Jinkang Zhu, Hongbin Zhang, Yucong Gu, Principle and Performance of Variable Rate Multi–code CDMA Method, 1995 Fourth IEEE International Conference on Universal Personal Communications. Record. Gateway to the 21st Century (Cat. No. 95TH8128). IEEE, pp. 256–259, New York, NY, USA, 1995.

J.G. Proakis, *Digital Communication,* Second Edition, Chapter 8, pp. 800–891, 1991. (This chapter of this book is cited in the disclosure of U.S. application No. 5,555,268.).

Poletti, M.A. and R.G. Vaughan, "Reduction of Multipath Fading Effect in Single Variable Modulations," ISSPA 90 Signal Processing Theories, Implementations and Applications, Gold Coast, Australia, pp. 672–676, Aug. 1990.

Casas, E.F. and C. Leung, "OFDM for Data Communications Over Mobile Radio FM Channels; Part II: Performance Improvement," University of British Columbia, 13 pages, 1991.

Casas, E.F. and C. Leung, "OFDM for Data Communications Over Mobile Radio FM Channels; Part I: Analysis and Experimental Results," *IEEE Transactions on Communications,* 39(5):783–793, May 1991.

Hoeher, P., J. Hagenauer, E. Offer, Ch. Rapp, H. Schulze, "Performance of an RCPC–Coded OFDM–based Digital Audio Broadcasting (DAB) System," Globecom '91, CH2980—1/91/0000–0040, pp. 0040–0046.

Kalet, I., "The Multitone Channel," *IEEE Transactions on Communications,* 37(2):119–124, Feb. 1989.

Zervos, N.A. and I. Kalet, "Optimized Decision Feedback Equalization versus Optimized Orthogonal Frequency Division Multiplexing for High–Speed Data Transmission Over the Local Cable Network," *IEEE,* CH2655–9/89/0000–1980, pp. 1080–1085, 1989.

Hirosaki, B., S. Hasegawa, and A. Sabato, "Advanced Groupband Data Modem Using Orthogonally Multiplexed QAM Technique," *IEEE Transactions on Communications,* vol. Com–34, No. 6, pp. 587–592, Jun. 1986.

Hirosaki, B., A. Yoshida, O. Tanaka, S. Hasegawa, K. Inoue, and K. Watanabe, "A 19.2 Kpbs Voiceband Data Modem Based on Orthogonally Multiplexed QAM Techniques," *IEEE,* CH2175–8/85/0000–0661, pp. 661–665, 1985.

Cimini, L.J. Jr., "Analysis and Simulation of a Digital Mobile Channel Using Orthogonal Frequency Division Multiplexing," *IEEE Transactions on Communications,* vol. Com–33, No. 7, pp. 665–675, Jul. 1985.

Hirosaki, B., "An Orthogonally Multiplexed QAM System Using the Discrete Fourier Transform," *IEEE Transactions on Communications,* vol. Com–294, No. 7, pp. 982–989, Jul. 1981.

Hirosaki, B., "An Analysis of Automatic Equalizers for Orthogonally Multiplexed QAM Systems," *IEEE Transactions on Communications,* vol. Com–28, No. 1, pp. 73–83, Jan. 1980.

Maruta, R. and A. Tomozawa, "An Improved Method for Digital SSB–FDM Modulation and Demodulation," *IEEE Transactions on Communications,* vol. Com–26, No. 5, pp. 720–725, May 1978.

Weinstein, S.B., and P.M. Ebert, "Data Transmission by Frequency–Division Multiplexing Using the Discrete Fourier Transform," *IEEE Transactions on Communications Technology,* vol. Com–19, No. 5, pp. 628–634, Oct. 1971.

Salzberg, B.R., "Performance of an Efficient Parallel Data Transmission System," *IEEE Transactions on Communications Technology,* vol. Com–15, No. 6, pp. 805–811, Dec. 1967.

Chang, R.W. and R.A. Gibby, "A Theoretical Study of Performance of an Orthogonal Multiplexing Data Transmission Scheme," *IEEE Transactions on Communications Technology,* vol. Com–16, No. 4, pp. 529–540, Aug. 1968.

Chang, R.W., "Synthesis of Band–Limited Orthogonal Signals for Multichannel Data Transmission," *The Bell System Technical Journal,,* pp. 1775–1796, Dec. 1966.

Alard, M., et al., "A New System of Sound Broadcasting to Mobile Receivers," *IEEE,* pp. 416–420, 1988.

Ananasso, Fulvio, and Giovanni Pennoni, "Clock Synchronous Multicarrier Demodulator for Multi–Frequency TDMA Communication Satellites," *IEEE,* pp. 1059–1063, 1990.

Chow, Jacky S., et al., "A Discrete–Multitone Transceiver System for HDSL Applications," *IEEE J. Select. Areas Commun.* 9(6):895–908, 1991.

Chow, Peter S., et al., "Performance Evaluation of a Multichannel Transceiver System for ADSL and VHDSL Services," *IEEE J. Select Areas Commun.* 9(6):909–919, 1991.

Duch, Krzysztof M., "Baseband Signal Processing," *IEEE Network Magazine,* pp. 39–43, Nov. 1991.

Gledhill, J.J., et al., "The Transmission of Digital Television in the UHF Band Using Orthogonal Frequency Division Multiplexing," *National Transcommunications Ltd. UK,* pp. 175–180, prior to Sep. 3, 1999.

Pupolin, Silvano, et al., "Performance Analysis of Digital Radio Links With Nonlinear Transmit Amplifier and Data Predistorter With Memory," *IEEE,* pp. 292–296, 1989.

Saito, Masafumi, et al., "A Digital Modulation Method for Terrestrial Digital TV Broadcasting Using Trellis Coded OFDM and Its Performance," *IEEE,* pp. 1694–1698, 1992.

* cited by examiner

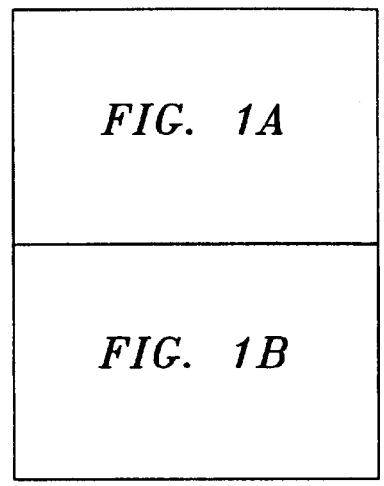
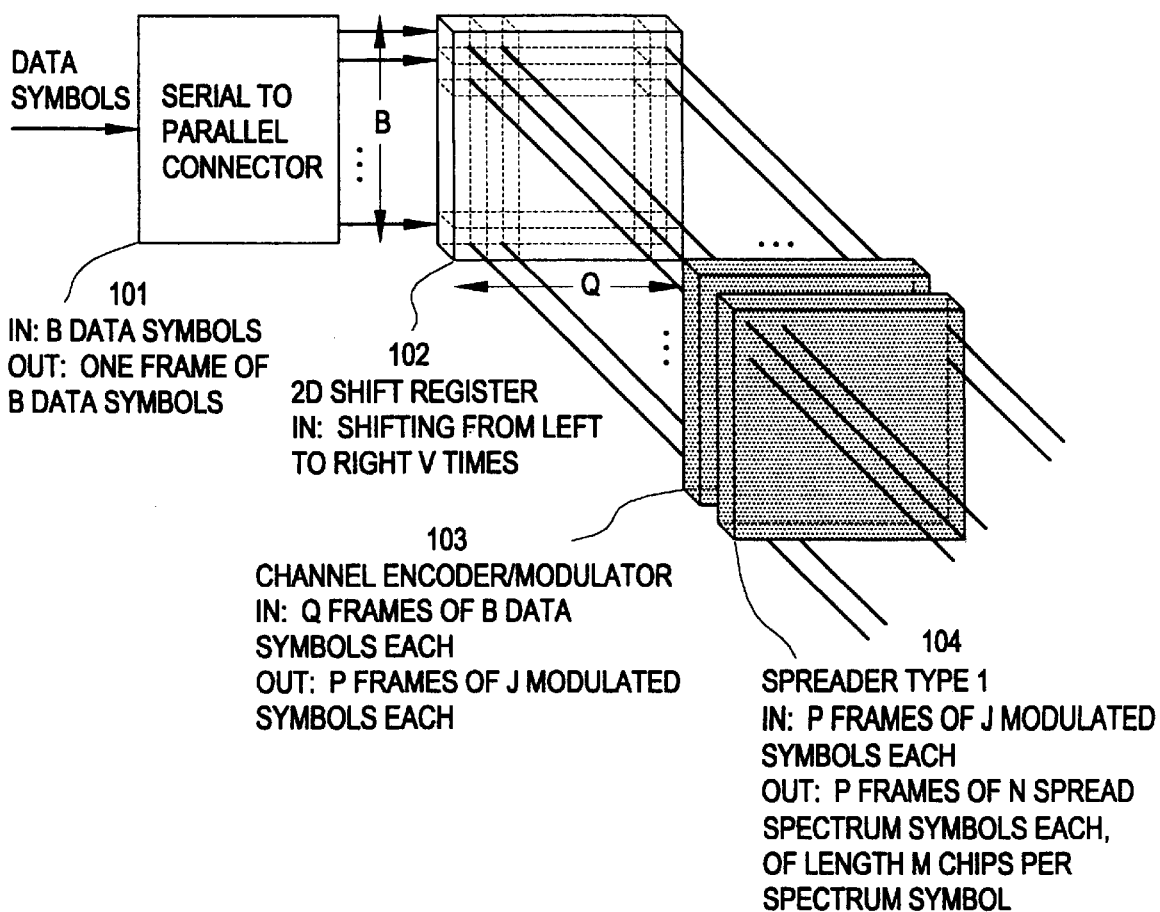
FIG. 1A

801
ITH M-POINT RANDOMIZING TRANSFORM
IN: M SUBSETS OF MODULATED SYMBOLS
OUT: M MULTICODED SS SYMBOLS

MULTICODE SPREAD SPECTRUM COMMUNICATIONS SYSTEM

CROSS-REFERENCE TO RELATED APPLICATIONS

This application is a continuation of U.S. application Ser. No. 08/725,556, filed on Oct. 3, 1996, now U.S. Pat. No. 6,192,068, priority from the filing date of which is hereby claimed under 35 U.S.C. §120.

STATEMENT REGARDING FEDERALLY SPONSORED RESEARCH OR DEVELOPMENT

Not applicable.

FIELD OF THE INVENTION

The invention deals with the field of multiple access communications using Spread Spectrum modulation. Multiple access can be classified as either random access, polling, TDMA, FDMA, CDMA or any combination thereof. Spread Spectrum can be classified as Direct Sequence, Frequency-Hopping or a combination of the two.

BACKGROUND OF THE INVENTION

Commonly used spread spectrum techniques are Direct Sequence Spread Spectrum (DSSS) and Code Division Multiple Access (CDMA) as explained respectively in Chapters 13 and 15 of "Digital Communication" by J. G. Proakis, Third Edition, 1995, McGraw Hill. DSSS (See Simon M. K. et al., "Spread Spectrum Communications Handbook," Revised Edition, McGraw-Hill, 1994 and see Dixon, R. C., "Spread Spectrum systems with commercial applications," Wiley InterScience, 1994) is a communication scheme in which information symbols are spread over code bits (generally called chips). It is customary to use noise-like codes called pseudo-random noise (PN) sequences. These PN sequences have the property that their auto-correlation is almost a delta function. In other words, proper codes perform an invertible randomized spreading of the information sequence. The advantages of this information spreading are:
1. The transmitted signal can be buried in noise and thus has a low probability of intercept.
2. The receiver can recover the signal from interferers (such as other transmitted codes) with a jamming margin that is proportional to the spreading code length.
3. DSSS codes of duration longer than the delay spread of the propagation channel can lead to multipath diversity implementable using a Rake receiver.
4. The FCC and Industry Canada have allowed the use of unlicensed low power DSSS systems of code lengths greater than or equal to 10 (part 15 rules) in some frequency bands (the ISM bands).

It is the last advantage (i.e. advantage 4, above) that has given much interest recently to DSSS.

An obvious limitation of DSSS systems is the limited throughput they can offer. In any given bandwidth, W, a code of length M will reduce the effective bandwidth to W/M. To increase the overall bandwidth efficiency, system designers introduced Code Division Multiple Access (CDMA) where multiple DSSS communication links can be established simultaneously over the same frequency band provided each link uses a unique code that is noise-like, i.e. provided the cross-correlation between codes is almost null. Examples of CDMA is the next generation of digital Cellular communications in North America: "the TIA Interim Standard IS-95," (see QUALCOMM Inc., "An overview of the application of Code Division Multiple Access (CDMA) to digital cellular systems and personal cellular networks," May 21, 1992 and see Viterbi, A. J., "CDMA, Principles of Spread Spectrum Communications," Addison-Wesley, 1995) where a Base Station (BS) communicates to a number of Mobile Stations (MS) simultaneously over the same channel. The MSs share one carrier frequency during the mobile-to-base link (also known as the reverse link) which is 45 MHz away from the one used by the BS during the base-to-mobile link (also known as the forward link). During the forward link, the BS transceiver is assigned N codes where N is less than or equal to M and M is the number of chips per DSSS code. During the reverse link each MS is assigned a unique code.

CDMA problems are:
1. The near-far problem on the reverse link: an MS transmitter "near" the BS receiver can overwhelm the reception of codes transmitted from other MSs that are "far" from the BS.
2. Synchronization on the reverse link: synchronization is complex (especially) if the BS receiver does not know in advance either the identity of the code being transmitted, or its time of arrival.

SUMMARY OF THE INVENTION

We have recognized that low power DSSS systems would be ideal communicators provided the problems of CDMA could be resolved. In order to avoid both the near-far problem and the synchronization problem that exist on the reverse link of a CDMA system, we have opted in this patent to use only the forward link at all times for MCSS Types I and II. This is achieved within a specified channel by allowing only one transceiver to transmit at a time within a certain coverage area. Such a transceiver is forced during transmission to act as the BS in transmit mode while the remaining transceivers are forced to act as MSs in receive mode. In this patent, we refer to such a modulation scheme as MultiCode Spread Spectrum (MCSS).

On the other hand, both the near-far problem and the synchronization problem that exist on the reverse link of a CDMA system are reduced drastically by using MCSS Type III. In this case, each user is assigned one code and each code is assigned a guard time such that it starts to transmit only after a given amount of time relative to any adjacent codes. By forcing the users to have separate start times, MCSS Type III forces the codes to be (quasi) orthogonal as long as the guard time between adjacent codes is long enough.

When viewed as DSSS, a MCSS receiver requires up to N correlators (or equivalently up to N Matched Filters) (such as in QUALCOMM Inc,. "An overview of the application of Code Division Multiple Access (CDMA)" to digital cellular systems and personal cellular networks, May 21, 1994 and as in Viterbi, A. J., "CDMA, Principles of Spread Spectrum Communications," Addison-Wesley, 1995) with a complexity of the order of NM operations. When both N and M are large, this complexity is prohibitive. In addition, a nonideal communication channel can cause InterCode Interference (ICI), i.e. interference between the N SS codes at the receiver. In this patent, we introduce three new types of MCSS. MCSS Type I allows the information in a MCSS signal to be detected using a sequence of partial correlations with a combined complexity of the order of M operations. MCSS Type II allows the information in a MCSS signal to be detected in a sequence of low complexity parallel operations while reducing the ICI. MCSS Type III allows the information in a MCSS signal to be detected in a sequence of low complexity Multiply and Accumulate (MAC) operations implementable as a filter, which reduce the effect of multipath. In addition to low complexity detection and ICI reduction, our implementation of MCSS has the advantage that it is spectrally efficient since N can be made approximately equal to M. In DSSS, N=1 while in CDMA typically N<0.4M.

BRIEF DESCRIPTION OF THE DRAWINGS

The foregoing aspects and many of the attendant advantages of this invention will become more readily appreciated and better understood by reference to the following detailed description, when taken in conjunction with the accompanying drawings, wherein.

DETAILED DESCRIPTION OF THE PREFERRED EMBODIMENT

The description of the invention consists of six parts. The first three parts correspond to the transmitter for each one of the three types of MCSS introduced in this patent, while the last three parts correspond to the receiver for each one of the three types of MCSS.

Description of the Transmitter for MCSS Type I

Figure 1B:
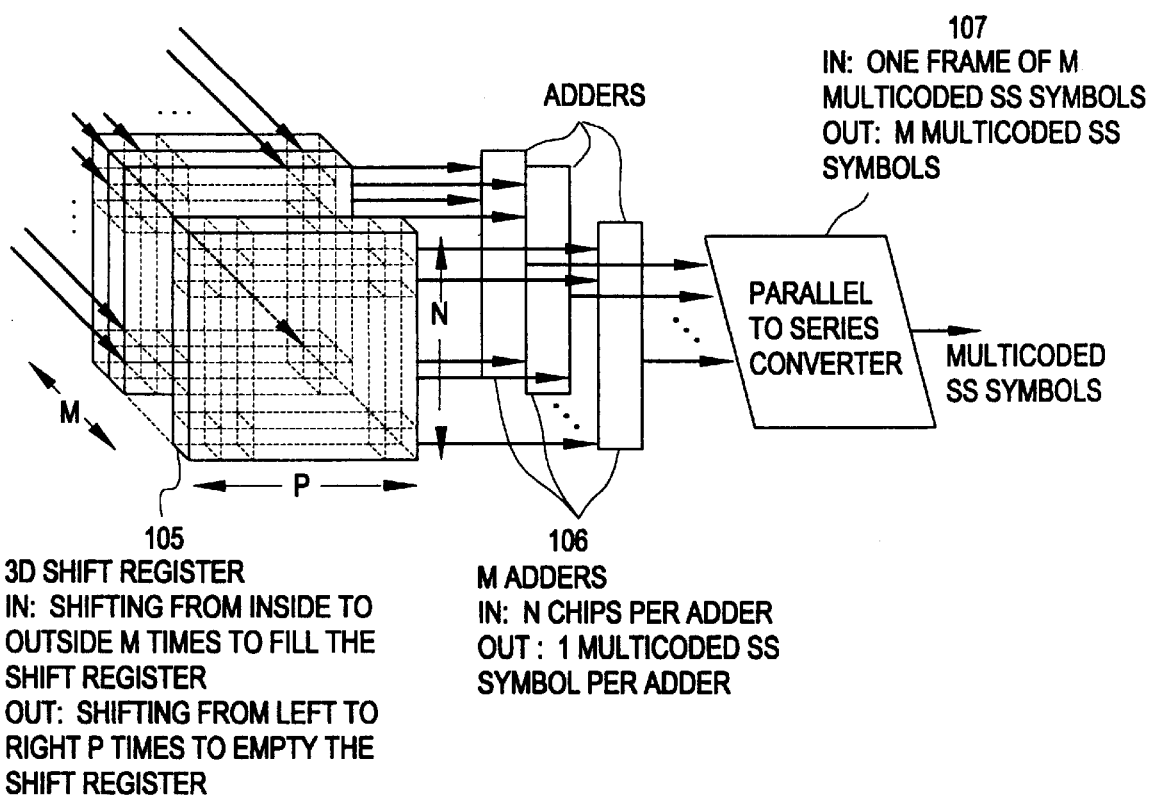
FIG. 1 provides an illustration of a Transmitter for MCSS Type I, wherein VB data symbols in VBT seconds are input and PM multicoded SS symbols in $PMT_C$ seconds are output.

FIG. 1 illustrates a block diagram of the transmitter for MCSS Type I with an input of V frames of B data symbols each, every VBT seconds and an output of P frames of M multicoded SS symbols each, every $PMT_C$ seconds where T is the duration of one data symbol and $T_C$ is the duration of one chip in a spread spectrum code. The data symbols can be either analog or digital. If digital, they belong to an alphabet of finite size. If analog, they correspond to the samples of an analog signal.

FIG. 1 is described as follows:

The first block in FIG. 1 is a serial-to-parallel converter (101) with an input of B data symbols and an output of one frame of B data symbols, every BT seconds.

The second block is a 2 Dimensional (2D) shift register (102) with an input of V frames of B data symbols each (input by shifting the frames from left to right V times) and an output of Q frames of B data symbols each, every VBT seconds.

When the data symbols are analog, the third block (103) in FIG. 1 corresponds to an analog pulse modulator with several possible modulation schemes such as Pulse Amplitude Modulation (PAM), Pulse Position Modulation (PPM), Pulse Frequency Modulation (PFM), etc. When the data symbols are digital, the third block is a channel encoder/modulator (103) with an input of Q frames of B data symbols each and an output of P frames of J modulated symbols each, every QBT seconds. The channel encoder/modulator performs two functions: (1) to encode and (2) to modulate the data symbols. The first function offers protection to the symbols against a non ideal communication channel by adding redundancy to the input sequence of data symbols while the second function maps the protected symbols into constellation points that are appropriate to the communication channel. Sometimes it is possible to perform the two functions simultaneously such as in the case of Trellis Coded Modulation (TCM). For simplicity, we assume throughout the patent that the two functions are performed simultaneously and refer to the block performing the two functions as the channel encoder/modulator.

Different types of channel encoders are available:

If the 2D shift register (102) is operated with: V=Q, then the encoder performs block encoding, otherwise if V<Q, the encoder performs convolutional encoding. Furthermore, if B>J then the encoder is a trellis encoded modulator either with block encoding if V=Q or with convolutional encoding with V<Q.

If B=J, the code rate is Q/P, i.e. the encoder takes Q data symbols in and generates P encoded data symbols out where P>Q. Furthermore, if V<Q then (V−1) is the constraint length of the convolutional encoder.

If the 2D shift register (102) is operated with B>1, then it can act as an interleaver which interleaves the data symbols prior to the channel encoder (103), otherwise if B=1 the channel encoder does not rely on interleaving. Another possible form of interleaving is to interleave the coded data symbols after the channel encoder (not shown in FIG. 1).

Different types of modulators are available such as: Binary Phase Shift Keying (BPSK), Quadrature Phase Shift Keying (QPSK), Multilevel Phase Shift Keying (MPSK), Quadrature Amplitude Modulation (QAM), Frequency Shift Keying (FSK), Continuous Phase Modulation (CPM), Amplitude Shift Keying (ASK), etc. All amplitude and frequency modulation schemes can be demodulated either coherently or noncoherently. All phase modulation schemes can de demodulated either coherently or differentially. In the latter case, differential encoding is required in the modulator such as in Differential BPSK (DBPSK), Differential QPSK (DQPSK), Differential MPSK (DMPSK), etc. Even though the output of the channel encoder/modulator (103) corresponds to an encoded and modulated data symbol, we will refer to it of as a 'modulated symbol'.

The fourth block is a spreader type I (104) with an input of P frames of J modulated symbols each and an output of P frames of N spread spectrum symbols each, of length M chips per spread spectrum symbol, every $PMT_C$ seconds. The spreader type I (104) is explained further below in FIGS. 2–5.

The fifth block is a 3 Dimensional (3D) shift register (105) with an input of P frames of N spread spectrum symbols each (input by shifting the PN symbols from inside to outside M chip times), and an output of M frames of N chips each (output by shifting MN chips from left to right P times) every $PMT_C$ seconds.

The sixth block is a set of M adders (106). Each adder has an input of N chips and an output of one multicoded SS symbol, every $MT_C$ seconds.

The seventh block is a parallel-to-serial converter (107) with an input of one frame of M multicoded SS symbol and an output of M multicoded SS symbol every $MT_C$ seconds.

Figure 2:
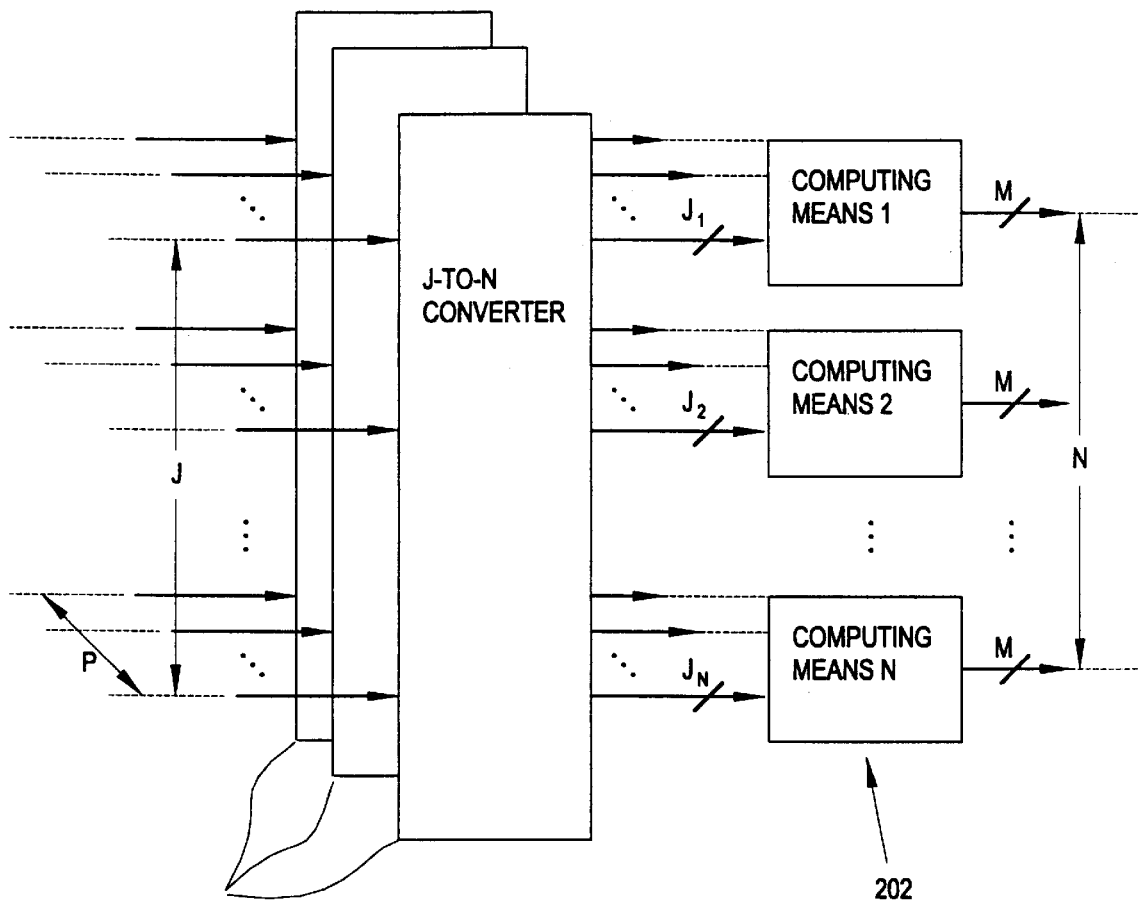
FIG. 2 provides a schematic illustration of a Spreader Type I (104) from FIG. 1, in which P frames of J modulated symbols each are input and P frames of N spread spectrum symbols each, of length M chips per spread spectrum symbol are output.

The spreader type I (104) in FIG. 1 is described further in FIG. 2 with an input of P frames of J modulated symbols each, generated by the channel encoder/modulator (103) in FIG. 1, and an output of P frames of N spread spectrum symbols each, of length M chips per spread spectrum symbol. FIG. 2 is described as follows:

The first block in FIG. 2 is a set of P converters (201) with an input of one frame of J modulated symbols per converter, and an output of one frame of N subsets of modulated symbols per converter. The ith subset contains a number $J_i$ of modulated symbols where $J_1+J_2+ \ldots +J_N=J$ and $i=1, \ldots ,N$.

The second block is a set of N computing means (202) with an input of one subset of modulated symbols per computing means, and an output of one spread spectrum symbol, of length M chips per computing means.

Figure 3:
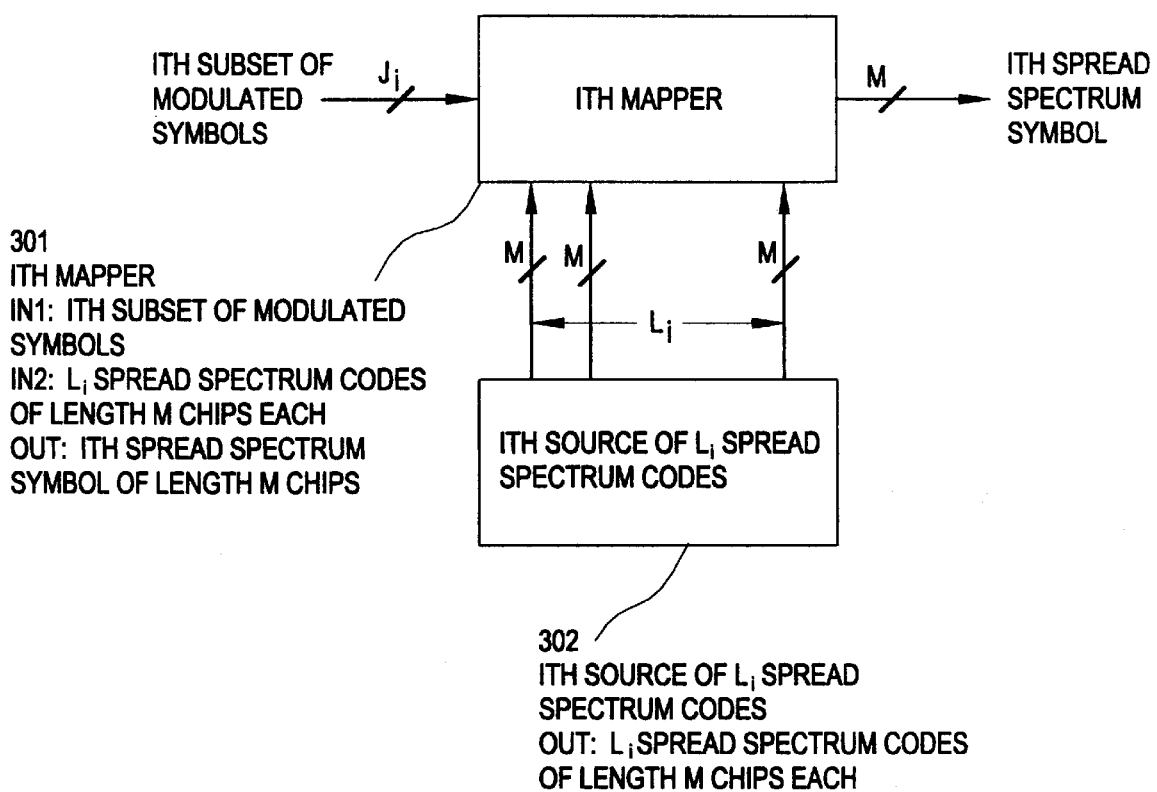
FIG. 3 provides a schematic of the ith computing means (202) from FIG. 2, in which an ith subset of modulated symbols is input and an ith spread spectrum symbol of length M chips is output.

The set of N computing means (202) in FIG. 2 is described further in FIG. 3 which displays only the ith computing mean where $i=1,\ldots,N$. The ith computing mean has as an input the ith subset of modulated symbols, and as an output the ith spread spectrum symbol of length M chips. FIG. 3 is described as follows.

The first block in FIG. 3 is the ith mapper (301) with two inputs and one output. The two inputs are: (1) the ith subset of modulated symbols which contains a number $J_i$ of modulated symbols, and (2) $L_i$ spread spectrum codes of length M chips each. The output is the ith spread spectrum symbol. The ith mapper chooses from the set of $L_i$ spread spectrum codes the code corresponding to the ith subset of modulated symbols to become the ith spread spectrum code representing an invertible randomized spreading of the ith subset of modulated symbols.

The second block in FIG. 3 is the ith source (302) of $L_i$ spread spectrum codes with an output of $L_i$ spread spectrum codes of length M chips each. The ith source (302) can be thought of as either a lookup table or a code generator. Two different implementations of the ith source are shown in FIGS. 4 and 5.

Remarks on the "Invertible Randomized Spreading"

1. In this patent, the invertible randomized spreading of a signal using a spreader is only invertible to the extent of the available arithmetic precision of the machine used to implement the spreader. In other words, with finite precision arithmetic, the spreading is allowed to add a limited amount of quantization noise.
2. Moreover, the randomized spreading of a signal is not a perfect randomization of the signal (which is impossible) but only a pseudo-randomization. This is typical of spread spectrum techniques in general.
3. Finally, in some cases such as over the multipath communication channel, it is advantageous to spread the signal over a bandwidth wider than 25% of the coherence bandwidth of the channel. In this patent, we refer to such a spreading as wideband spreading. In the indoor wireless channel, 25% of the coherence bandwidth ranges from 2 MHz to 4 MHz. In the outdoor wireless channel, 25% of the coherence bandwidth ranges from 30 KHz to 60 KHz. In other words, in this patent wideband spreading corresponds to a spreading of the information signal over a bandwidth wider than 30 KHz over the outdoor wireless channel and wider than 2 MHz over the indoor wireless channel, regardless of the bandwidth of the information signal and regardless of the carrier frequency of modulation.

Figure 4:
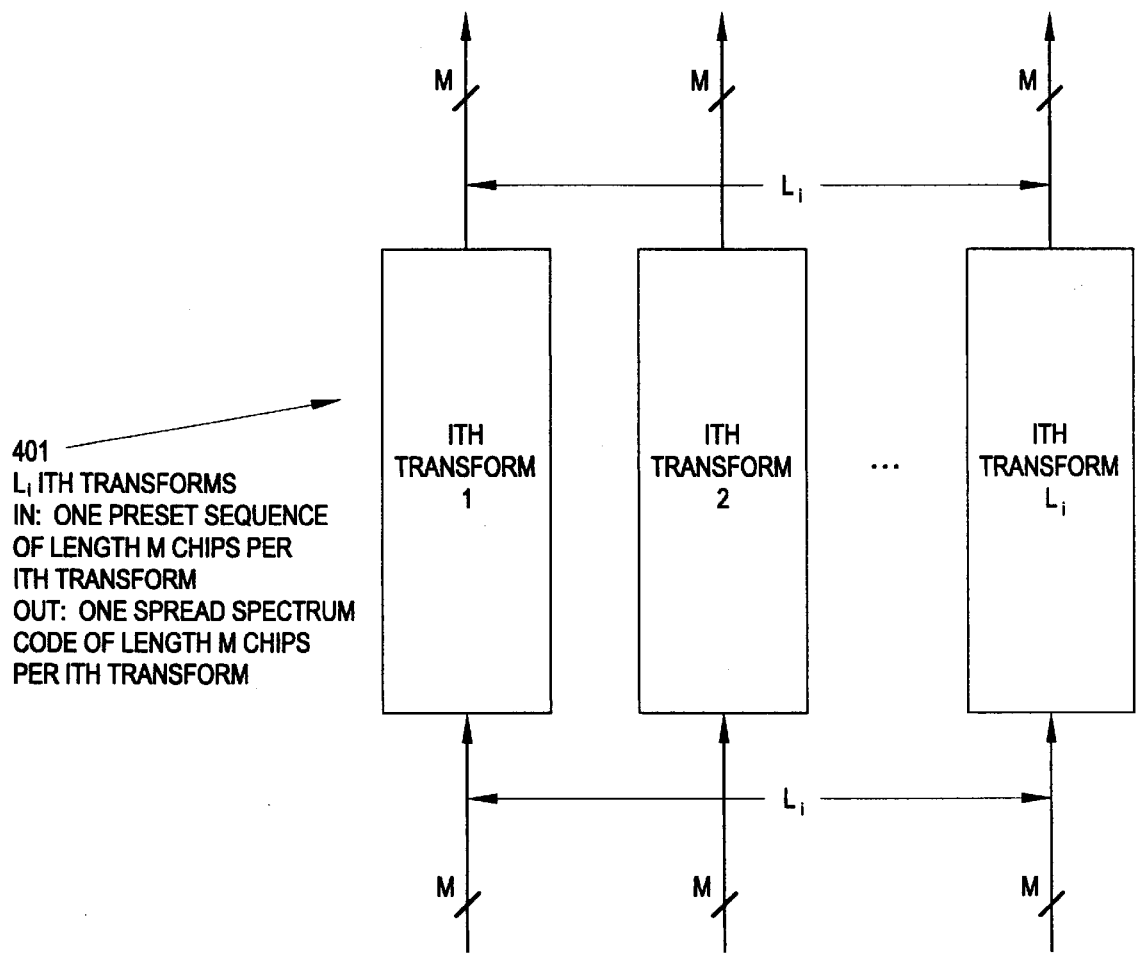
FIG. 4 provides a schematic of the ith source (302) from FIG. 3 of $L_i$ spread spectrum codes, in which $L_i$ preset sequences of length M chips each are input, and $L_i$ spread spectrum codes of length M chips each are output.
Figure 5:
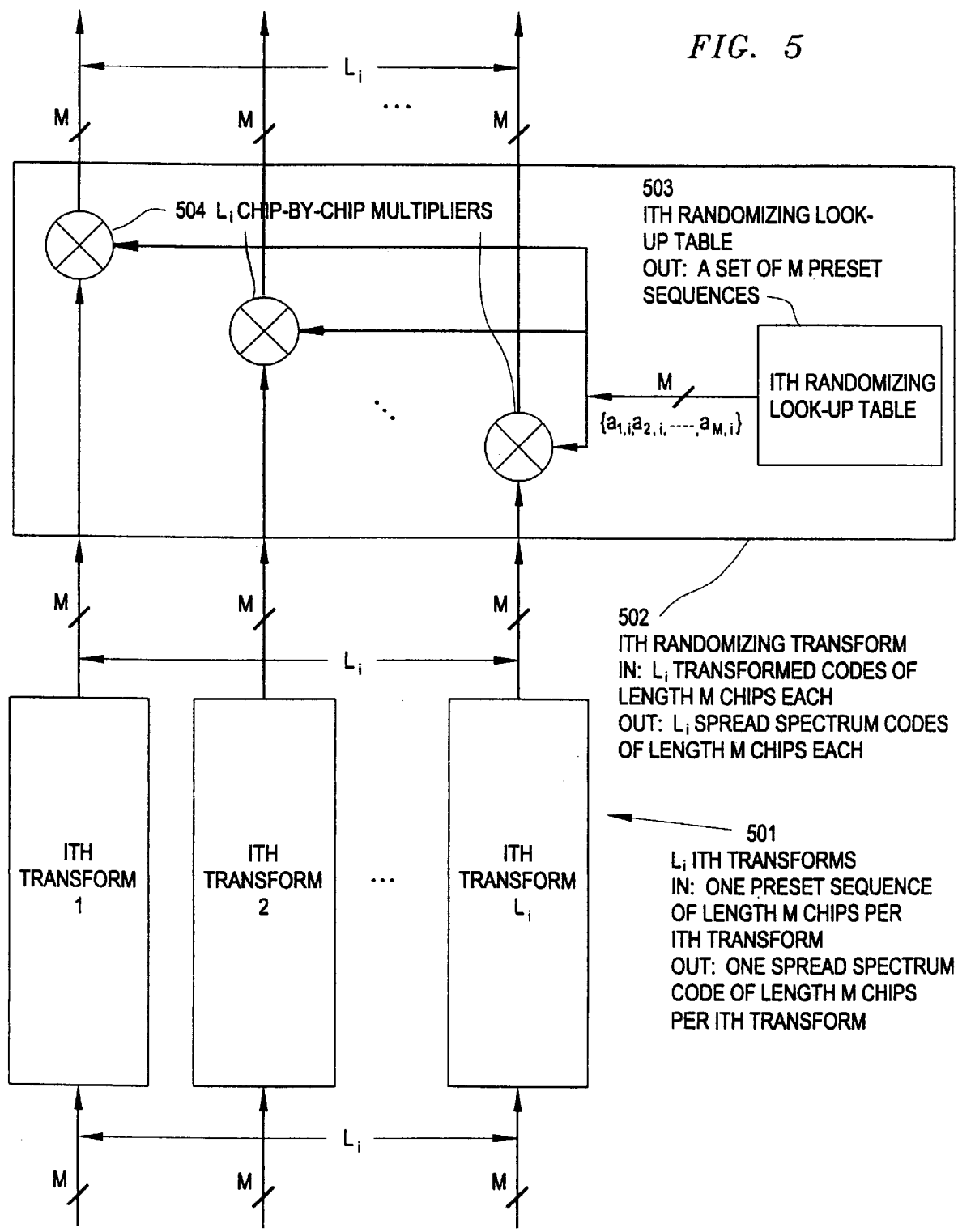
FIG. 5 provides a schematic of the ith source (302) from FIG. 3 of $L_i$ spread spectrum codes, in which $L_i$ preset values of length M chips each are input, and $L_i$ spread spectrum codes of length M chips each are output.

The ith source (302) of FIG. 3 can also be generated as in FIG. 4 as a set of $L_i$ transforms with an input of one preset sequence of length M chips per transform and an output of one spread spectrum code of length M chips per transform. In other words, the ith source of spread spectrum codes could be either a look-up table containing the codes such as in FIG. 3 or a number of transforms generating the codes such as in FIG. 4.

The ith source (302) of FIG. 3 can also be generated as in FIG. 5 as two separate blocks.

The first block (501) consists of a set of $L_i$ transforms with an input of one preset sequence of length M chips per transform and an output of one spread spectrum code of length M chips per transform.

The second block is a randomizing transform (502) with an input of $L_i$ transformed codes of length M chips each generated by the first block (501) and an output of $L_i$ spread spectrum codes of length M chips each.

The randomizing transform consists of two parts. The first part is a randomizing look-up table (503) which contains a set of M preset values: $a_{1,i}, a_{2,i}, \ldots, a_{M,i}$. The second part multiplies each transformed symbol from the set of transformed symbols generated by the first transform (501) by the set of M preset values generated by the randomizing look-up table (503). The multiplication is performed chip-by-chip, i.e. the kth chip in the ith transformed symbol is multiplied by the kth value $a_{k,i}$ in the set of M preset values for all values of k=1, . . . , M.

Description of the Transmitter for MCSS Type II

Figure 6:
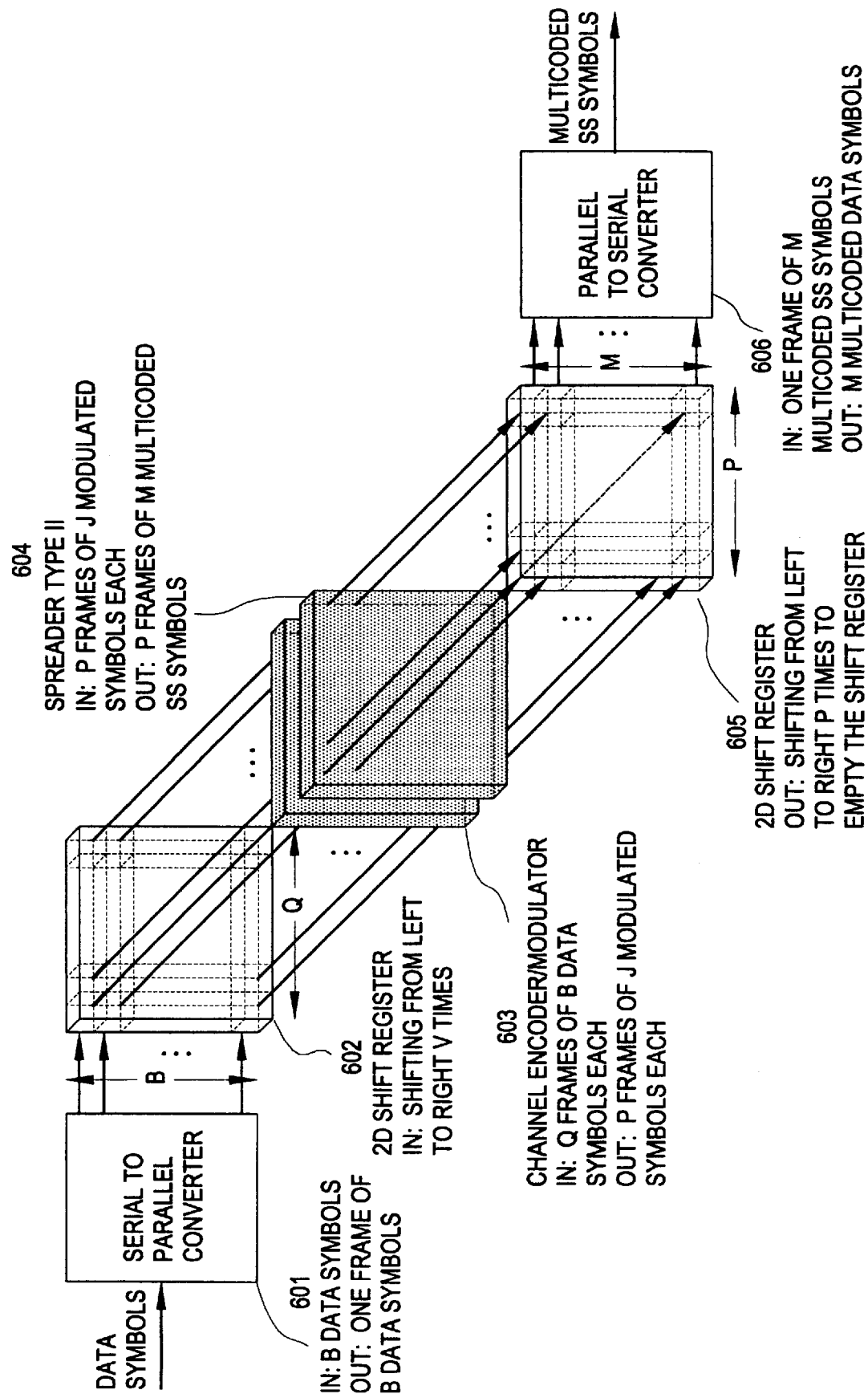
FIG. 6 provides a schematic of the Transmitter for MCSS Type II, in which VB data symbols in VBT seconds are input, and PM multicoded SS symbols in $PMT_C$ seconds are output.

FIG. 6 illustrates a block diagram of the transmitter for MCSS Type II with an input of VB data symbols every VBT seconds and an output of PM multicoded SS symbols every $PMT_C$ seconds. FIG. 6 is described as follows:

The first block in FIG. 6 is a serial-to-parallel converter (601) with an input of B data symbols and an output of one frame of B data symbols, every BT seconds.

The second block is a 2 Dimensional (2D) shift register (602) with an input of V frames of B data symbols each (input by shifting the frames from left to right V times) and an output of Q frames of B data symbols each, every VBT seconds.

The third block is a channel encoder/modulator (603) with an input of Q frames of B data symbols each and an output of P frames of J modulated symbols each, every QBT seconds. The function of the channel encoder/modulator is exactly the same as the channel encoder/modulator (103) described above for MCSS type I in FIG. 1.

The fourth block is a spreader type II (604) with an input of P frames of J modulated symbols each and an output of P frames of M multicoded SS symbols each, every $PMT_C$ seconds. The spreader type II is explained further below in FIGS. 7–9.

The fifth block is a 2 Dimensional (2D) shift register (605) with an input of P frames of M multicoded SS symbols each, and an output of P frames of M multicoded SS symbols each (output by shifting the M frames from left to right P times) every $PMT_C$ seconds.

The sixth block is a parallel-to-serial converter (606) with an input of one frame of M multicoded SS symbols and an output of M multicoded SS symbols every $MT_C$ seconds.

Figure 7:
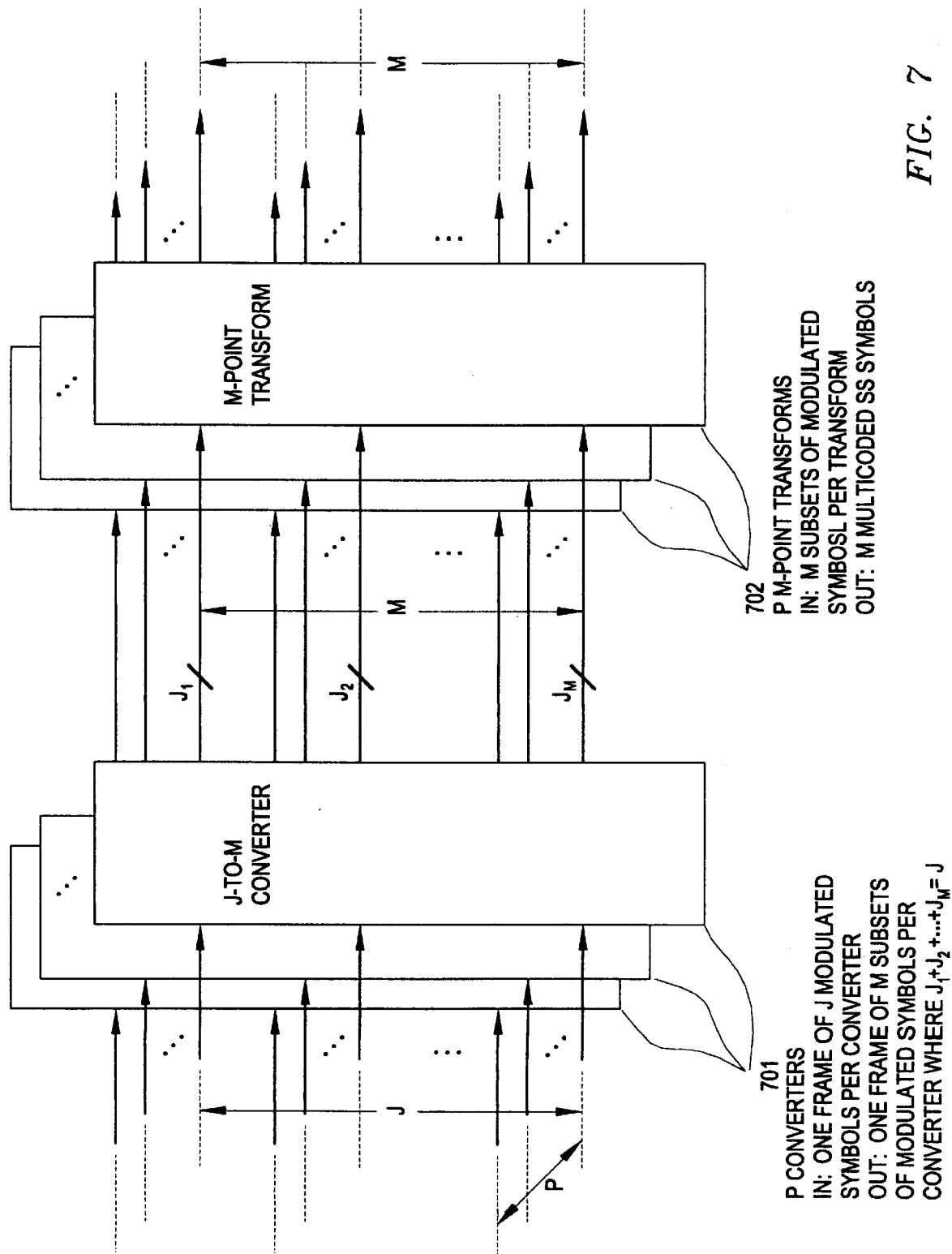
FIG. 7 provides a schematic of the Spreader Type II (604) from FIG. 6, in which P frames of J modulated symbols each are input and P frames of M multicoded SS symbols are output.

The spreader type II (604) in FIG. 6 is described further in FIG. 7 with an input of P frames of J modulated symbols each, generated by the channel encoder/modulator (603) in FIG. 6, and an output of P frames of M multicoded SS symbols each. FIG. 7 is described as follows:

The first block in FIG. 7 is a set of P converters (701) with an input of one frame of J modulated symbols per converter, and an output of one frame of M subsets of modulated symbols per converter. The ith subset contains a number of $J_i$ of modulated symbols where $J_1+J_2+ \ldots +J_M=J$ and i=1, . . . ,M.

The second block is a set of P M-point transforms (702) with an input of M subsets of modulated symbols per transform, and an output of a frame of M multicoded SS symbols per transform. The P M-point transforms perform the invertible randomized spreading of the M subsets of modulated symbols.

Figure 8:
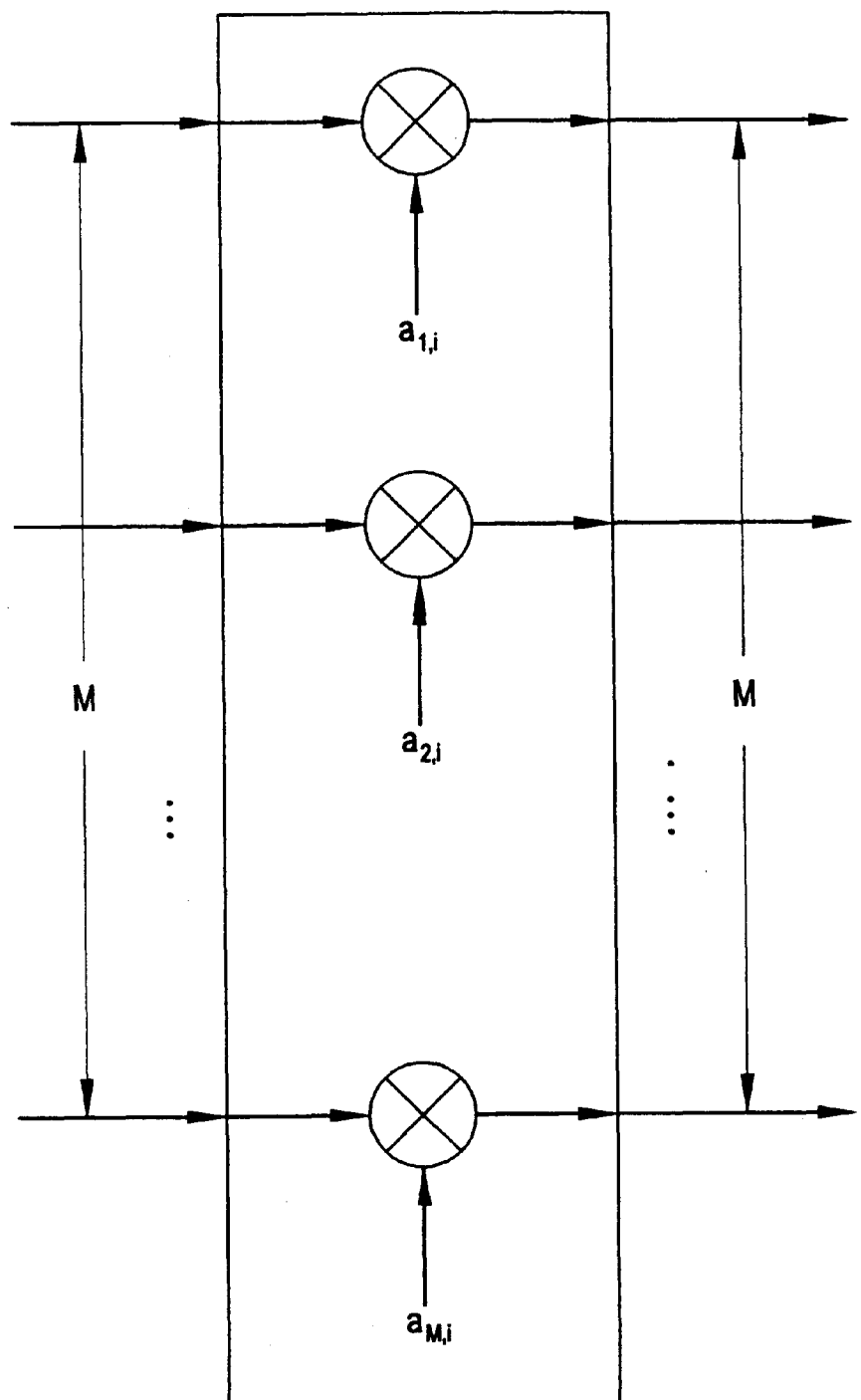
FIG. 8 provides the ith M-point Transform (702) from FIG. 7, in which M subsets of modulated symbols are input and M multicoded SS symbols are output.

The set of P M-point transforms (702) in FIG. 7 is described further in FIG. 8 which displays only the ith M-point transform where i=1, . . . ,N. The input of the ith transform is the ith subset of $J_i$ modulated symbols, and the output is the ith frame of M multicoded SS symbols. In FIG. 8, the ith M-point transform is the randomizing transform (801) similar to the randomizing transform (502) in FIG. 5 with the set of preset values given as: $a_{1,i}, a_{2,i}, \ldots, a_{M,i}$. In this case, the kth preset value $a_{k,i}$ multiplies the kth subset of $J_k$ modulated symbols to generate the kth multicoded SS symbol.

Figure 9:
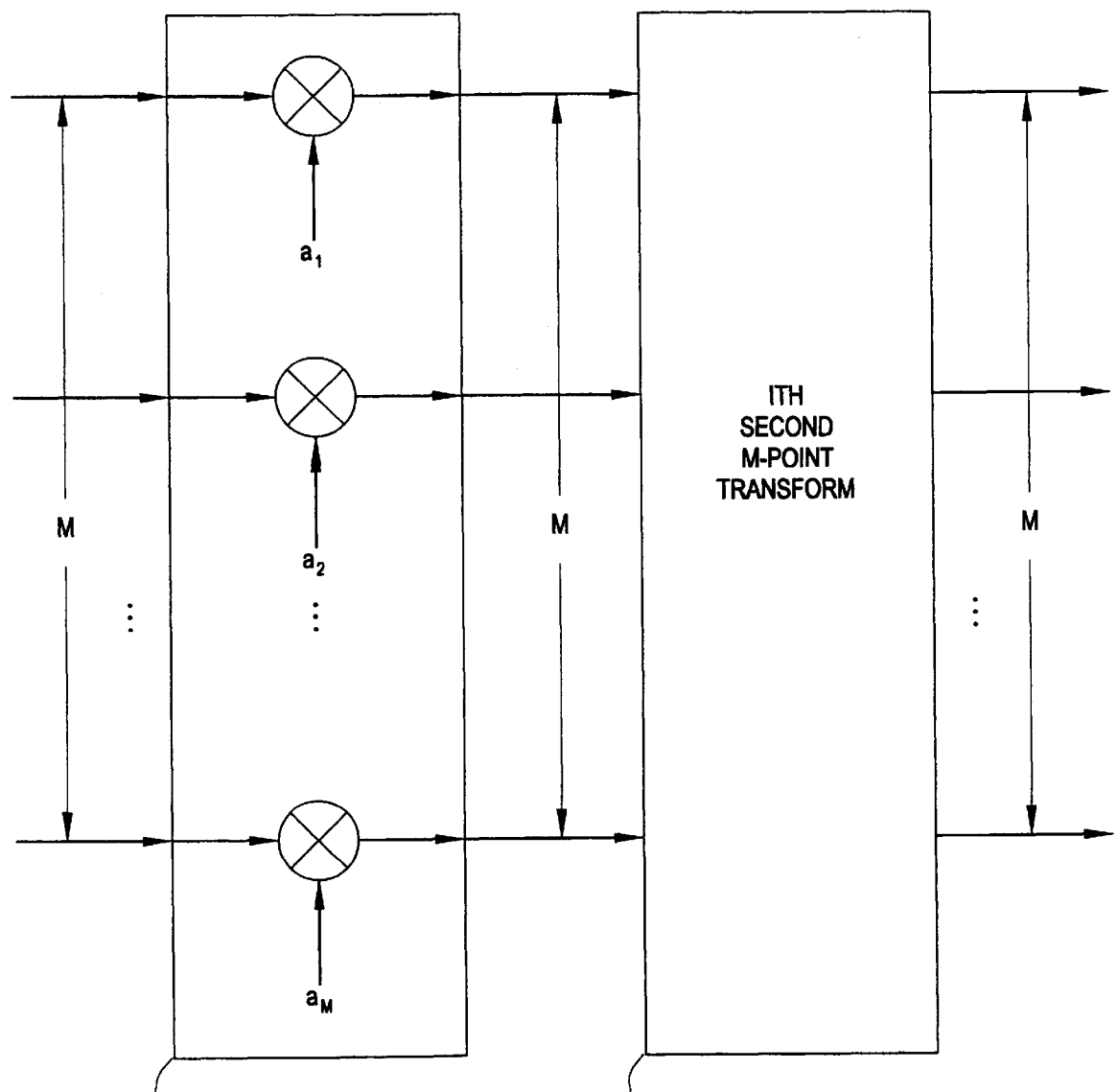
FIG. 9 provides the ith M-point Transform (702) from FIG. 7, in which M subsets of modulated symbols are input and M multicoded SS symbols are output.

The ith M-point transform (801) in FIG. 8 can further include a second M-point transform (902) as described in FIG. 9.

The first M-point transform (901) is the ith randomizing transform with an input of the ith subset of $J_i$ modulated symbols, and an output of the ith frame of M transformed symbols.

The second M-point transform (902) is the ith second M-point transform with an input of the ith frame of transformed symbols, and an output of the ith frame of M multicoded SS symbols.

Description of the Transmitter for MCSS Type III

Figure 10:
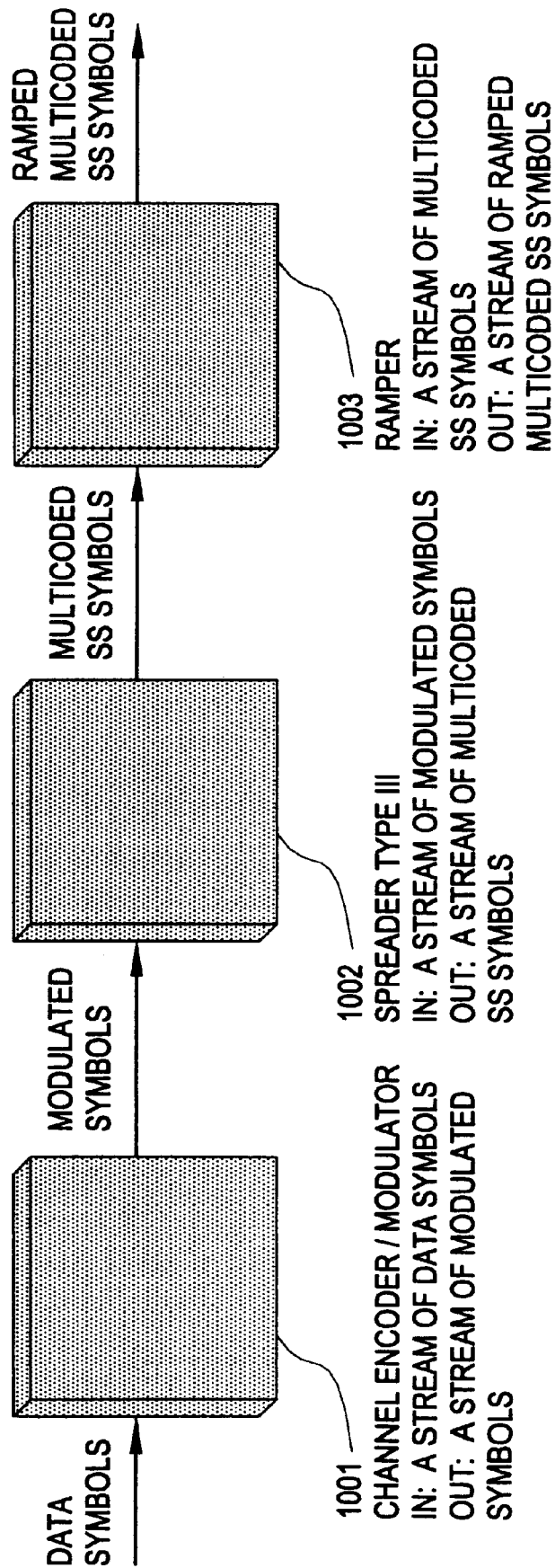
FIG. 10 provides a schematic of the MCSS Transmitter Type III, in which a stream of data symbols is input and a stream of ramped multicoded SS symbols is output.

FIG. 10 illustrates a block diagram of the transmitter for MCSS Type III with an input of a stream of data symbols and an output of a stream of multicoded SS symbols. FIG. 10 is described as follows:

The first block is a channel encoder/modulator (1001) with an input of a stream of data symbols and an output of a stream of modulated symbols. The function of the channel encoder/modulator is similar to the channel encoder/modulator for MCSS types I and II (103) and (603) respectively except its operation is serial. Such a representation is commonly used in textbooks to implicitly imply that the data rate of the output stream of modulated symbols could be different from the input stream of data symbols. In other words, the channel encoder/modulator can add redundancy to the input stream of data symbols to protect it against channel distortion and noise. The type of redundancy varies depending on the type of encoding used. In block encoding, the redundancy depends only on the current block of data. In convolutional encoding, it depends on the current block and parts of the previous block of data. In both types of encoding trellis coding can be used which modulates the modulated symbols output from the encoder.

Even though FIG. 10 does not contain an interleaver, it is possible to include one either before the channel encoder/modulator or after.

The second block is a spreader type III (1002) with an input of a stream of modulated symbols and an output of a stream of multicoded SS symbols. The spreader type III is further explained in FIGS. 11–13.

The third block is a ramper (1003) with an input of multicoded SS symbols and an output of a ramped multicoded SS symbols. The ramper is further explained in FIG. 14.

Figure 11:
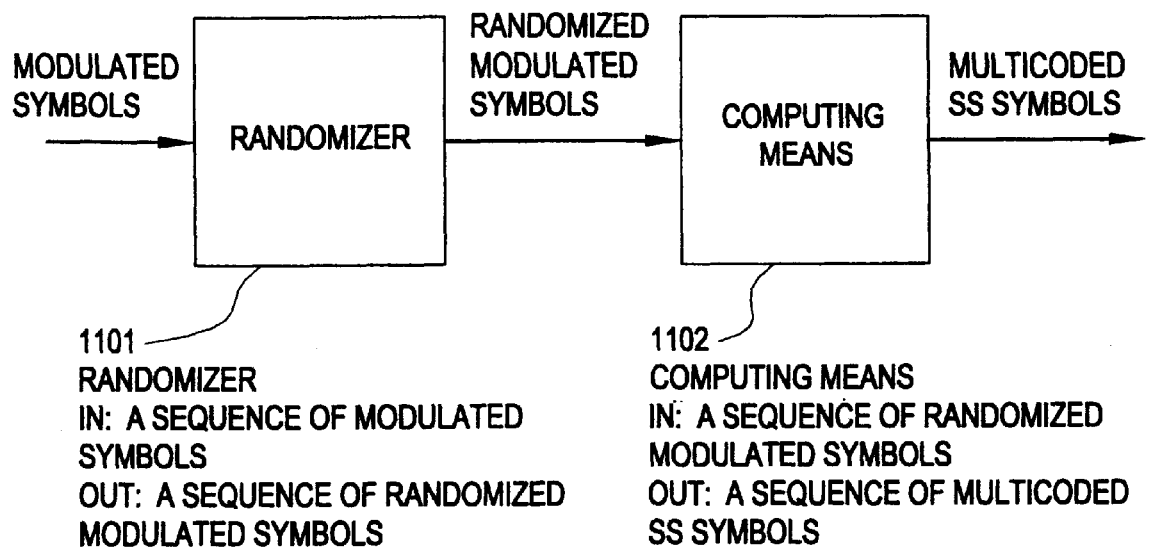
FIG. 11 provides a schematic of the Spreader (1002) Type III in FIG. 10, in which a sequence of modulated symbols is input and a sequence of multicoded SS symbols is output.

The spreader type II (1002) in FIG. 10 is describe further in FIG. 11 as two blocks with an input of a stream of modulated symbols, generated by the channel encoder/modulator (1001) in FIG. 10, and an output of a stream of multicoded SS symbols.

The first block is a randomizer (1101) with an input of a stream of modulated symbols and an output of a randomized modulated symbols. The randomizer is described further in FIG. 12.

The second block is a computing means (1102) with an input of the stream of randomized modulated symbols and an output of a stream of multicoded SS symbols. The computing means is described further in FIG. 13.

Figure 12:
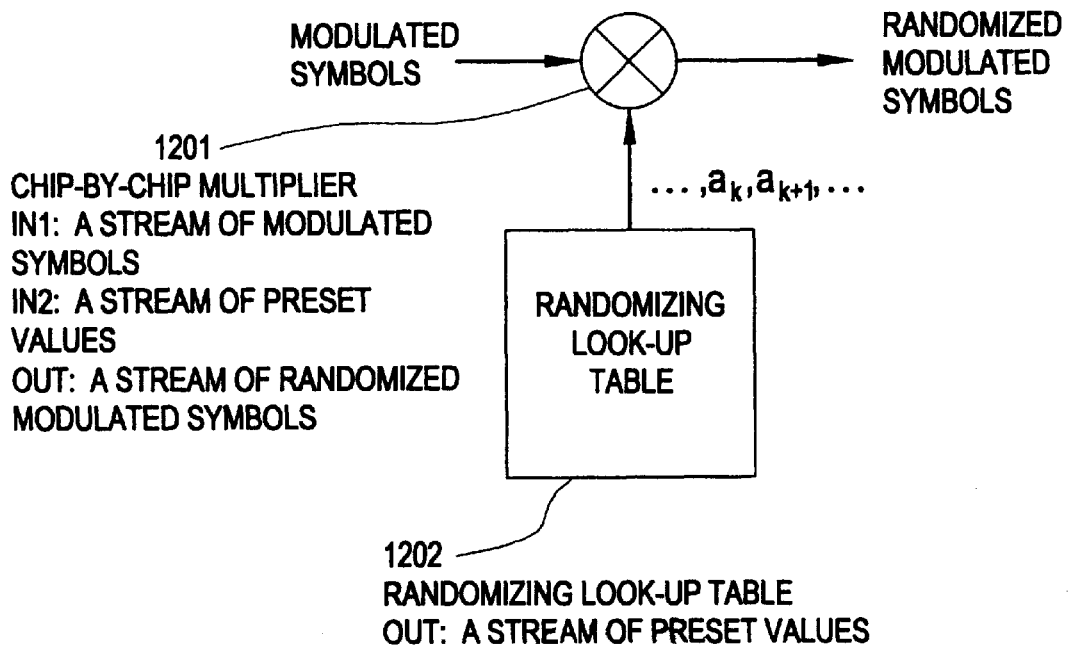
FIG. 12 provides a schematic of the Randomizer (1101) in FIG. 11, in which a sequence of modulated symbols is input and a sequence of randomized modulated symbols is output.

In FIG. 12 the randomizer (1101) from FIG. 11 is described further as two parts.

The first part is a chip-by-chip multiplier (1201) with two inputs and one output. The first input is the stream of modulated symbols and the second input is a stream of preset values output from a randomizing lookup table (1202). The output is the product between the two inputs obtained chip-by-chip, i.e. the kth randomized modulated symbols is obtained by multiplying the kth modulated symbol with the kth preset value $a_k$.

The second part is the randomizing lookup table (1202) which is the source of a stream of preset values: . . . ,$a_k, a_{k+1}$, . . . As mentioned before, the randomizing sequence is only pseudo-randomizing the modulated symbols.

Figure 13:
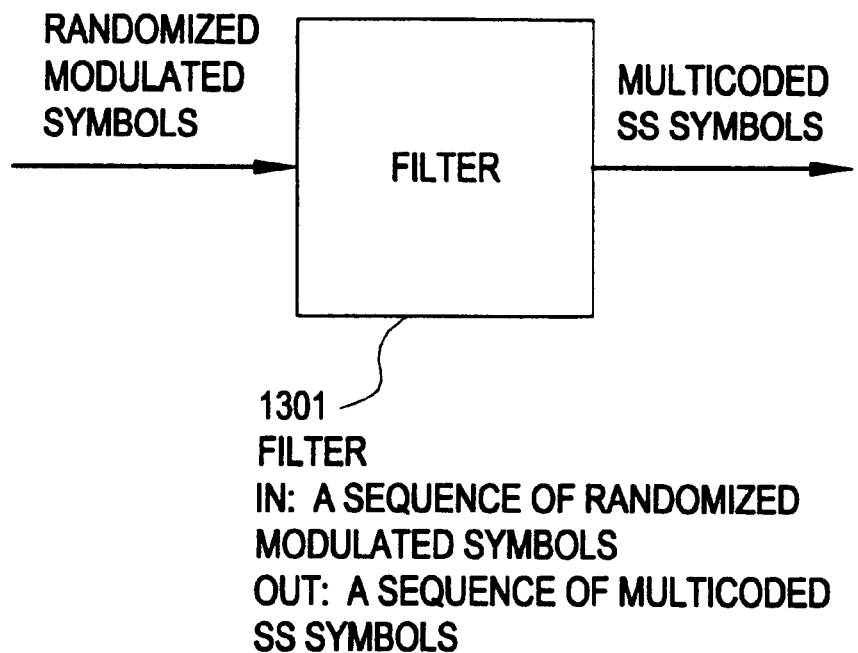
FIG. 13 provides a schematic of the Computing Means (1102) in FIG. 11, in which a sequence of randomized modulated symbols is input and a sequence of multicoded SS symbols is output.

In FIG. 13 the computing means (1102) from FIG. 11 is described further as a filter which performs the invertible randomized spreading of the stream of modulated symbols.

Figure 14:
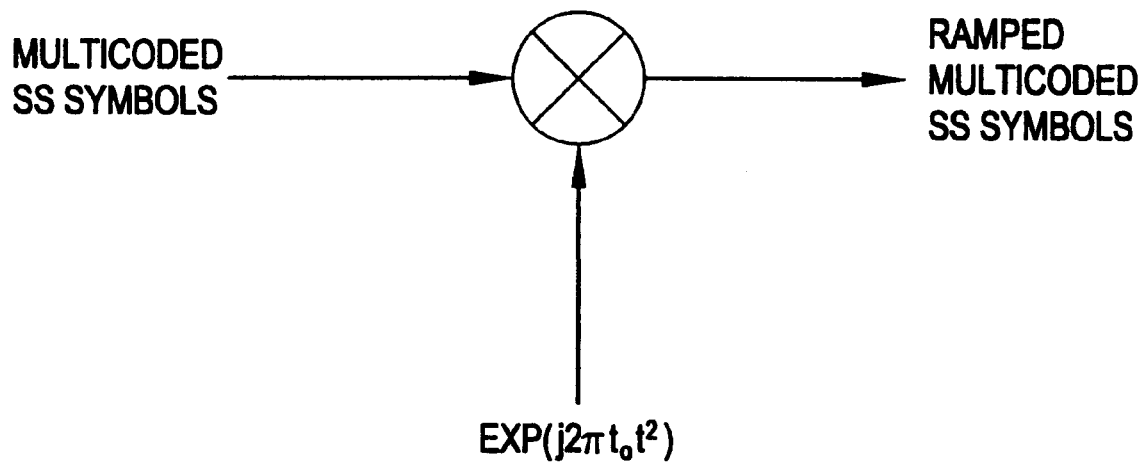
FIG. 14 provides a schematic of the Ramper (1003) in FIG. 10 for ramping the multicoded SS symbols using a linearly ramping carrier frequency, in which a sequence of multicoded SS symbols is input and a sequence of ramped multicoded SS symbols is output.

FIG. 14 illustrates the ramper (1003) in FIG. 10 as a mixer with two inputs and one output. The first input is the stream of multicoded SS symbols, the second input is a linearly ramping carrier frequency $e^{j2\pi f_o t^2}$ which ramps the multicoded SS stream over the time 't' thereby generating a stream of ramped multicoded SS symbols where $j=\sqrt{-1}$ and $f_o$ is a constant.

Description of the Receiver for MCSS Type I

Figure 15:
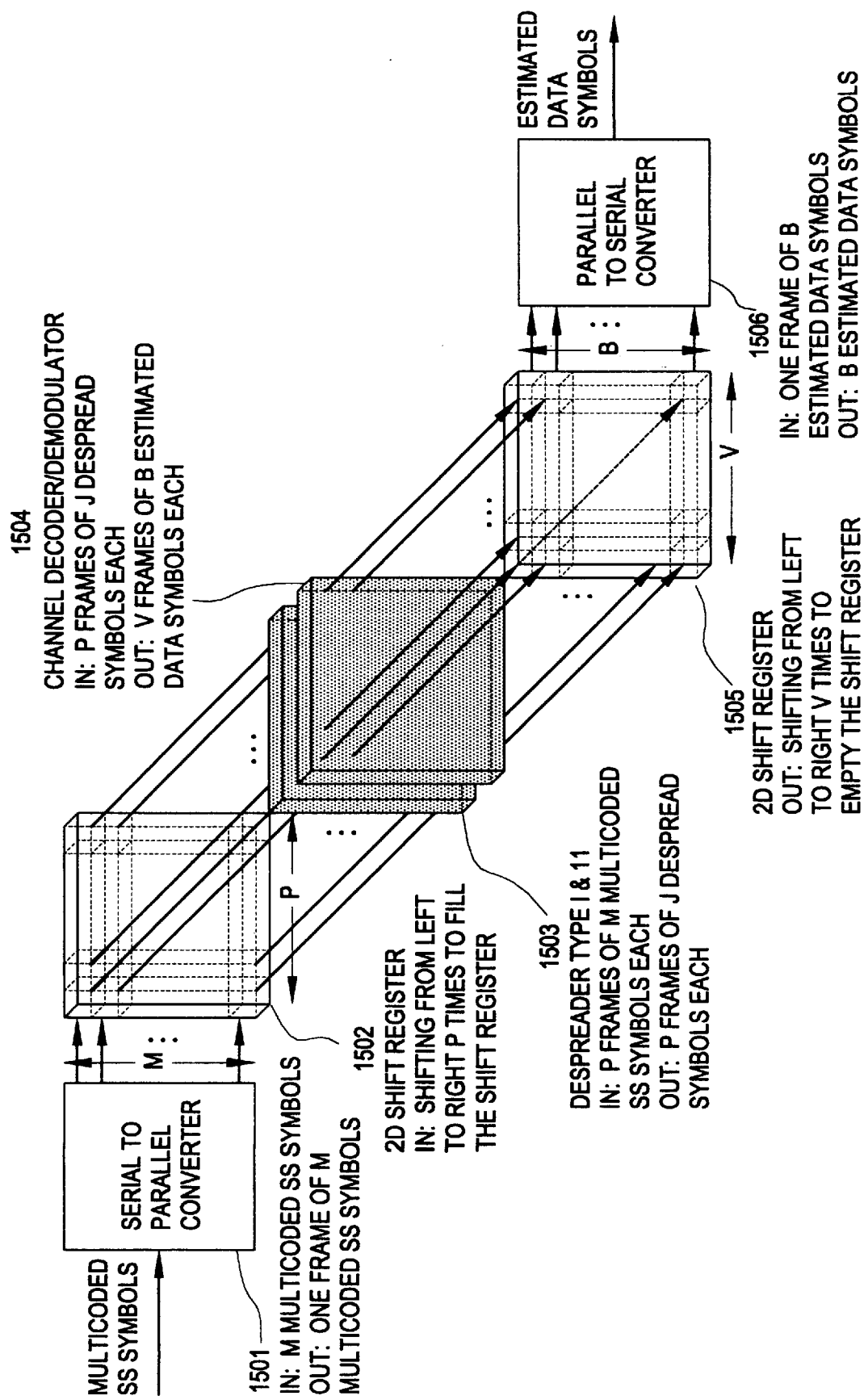
FIG. 15 provides a schematic of the Receiver for MCSS Type I & II, in which PM multicoded SS symbols in $PMT_C$ seconds is input and VB estimated data symbols in VBT seconds is output.

FIG. 15 illustrates a block diagram of the receiver for MCSS type I & II with an input of PM multicoded SS symbols, every $PMT_C$ seconds and an output of VB estimated data symbols, every VBT seconds. FIG. 15 is described as follows:

The first block in FIG. 15 is a serial-to-parallel converter (1501) with an input of M multicoded SS symbols and an output of one frame of M multicoded SS symbols every $MT_C$ seconds.

The second block is a 2 Dimensional (2D) shift register (1502) with an input of one frame of M multicoded SS symbols each (input by shifting the frame from left to right P times) and an output of P frames of M multicoded SS symbols each, every $PMT_C$ seconds.

The third block is a despreader type I (1503) with an input of P frames of M multicoded SS symbols each and an output of P frames of J despread symbols each every $PMT_C$ seconds. The despreader type I is further explained below.

The fourth block is a channel decoder/demodulator (1504) with an input of P frames of J despread symbols each and an output of V frames of B estimated data symbols each, every VBT seconds. The channel decoder/demodulator performs two functions: (1) to map the despread symbols into protected data symbols and (2) either to detect errors, or to correct errors, or both. Sometimes, the two functions can be performed simultaneously. In this case, the channel decoder/demodulator performs soft-decision decoding, otherwise, it performs hard-decision decoding. By performing the two function, the channel encoder/demodulator accepts the despread symbols and generates estimated data symbols The fifth block is a 2 Dimensional (2D) shift register (1505) with an input of V frames of B estimated data symbols each, and an output of V frames of B estimated data symbols (output by shifting the V frames from left to right) every VBT seconds. If the 2D shift register (102) is operated with B>1, then it might act as an interleaver. In this case, the receiver requires a de-interleaver which is accomplished using the 2D shift register (1505).

The sixth block is a parallel-to-serial converter (1506) with an input of one frame of B estimated data symbols and an output of B estimated data symbols, every VBT seconds.

Figure 16:
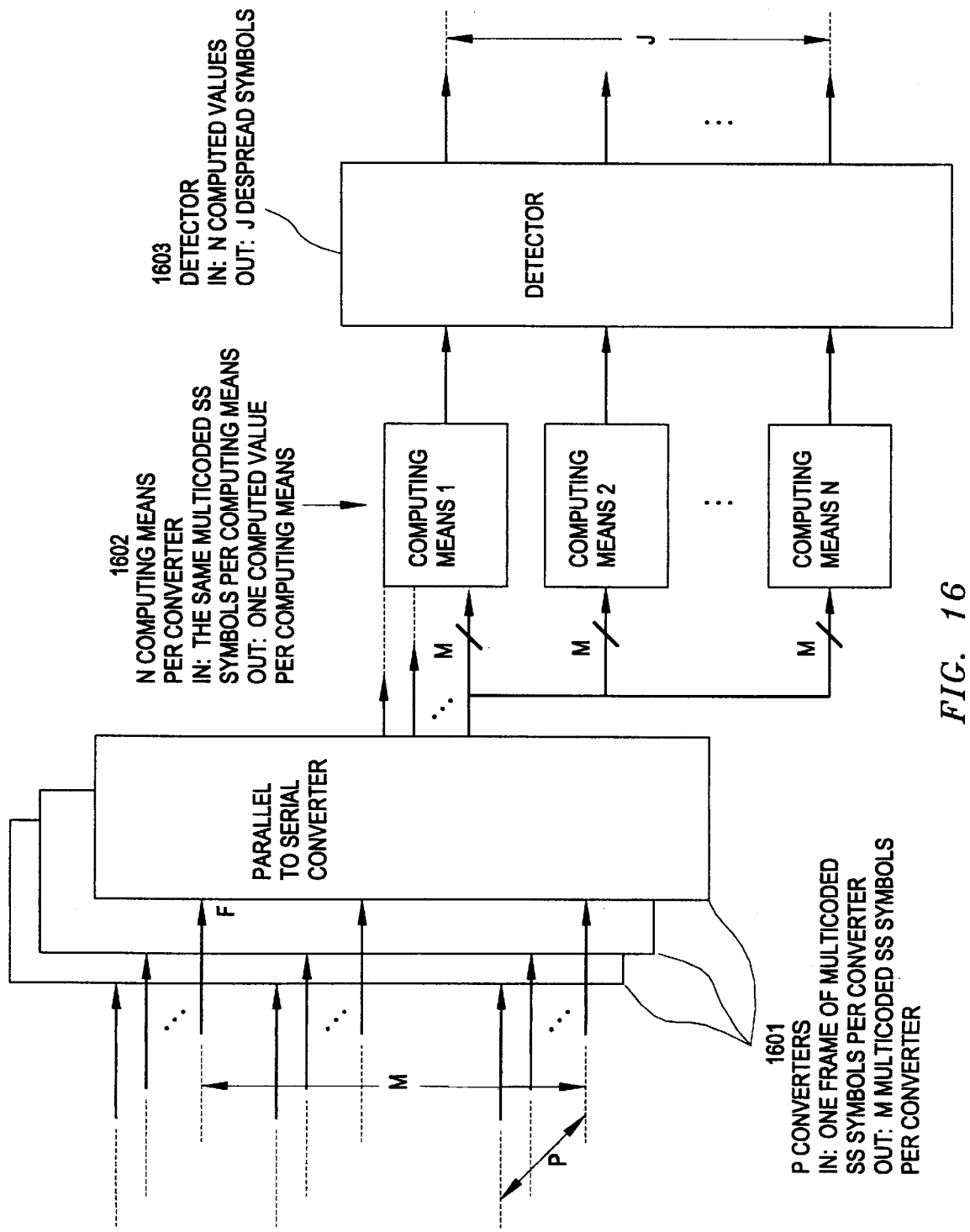
FIG. 16 provides a schematic of the Despreader Type I (1503) from FIG. 15, in which P frames of M multicoded SS symbols each are input and P frames of J despread symbols each is output.

The despreader type I (1504) in FIG. 15 is described further in FIG. 16 with an input of P frames of M multicoded SS symbols each from the received sequence of multicoded SS symbols, and an output of P frames of J despread symbols each. FIG. 16 is described as follows:

The first block in FIG. 16 is a set of P parallel-to-serial converters (1601) with an input of one frame of M multicoded SS symbols per converter, and an output of M multicoded SS symbols per converter.

The second block is a set of N computing means (1602) each having the same input of M multicoded SS symbols and an output of one computed value per computing means.

The third block is a detector (1603) with an input of N computed values and an output of J despread symbols per detector. When the data symbols are digital, the detector can make either hard decisions or soft decisions. When the data symbols are analog, $L_i$ is necessarily equal to 1 for i=1, . . . ,N and the detector is not required.

Figure 17:
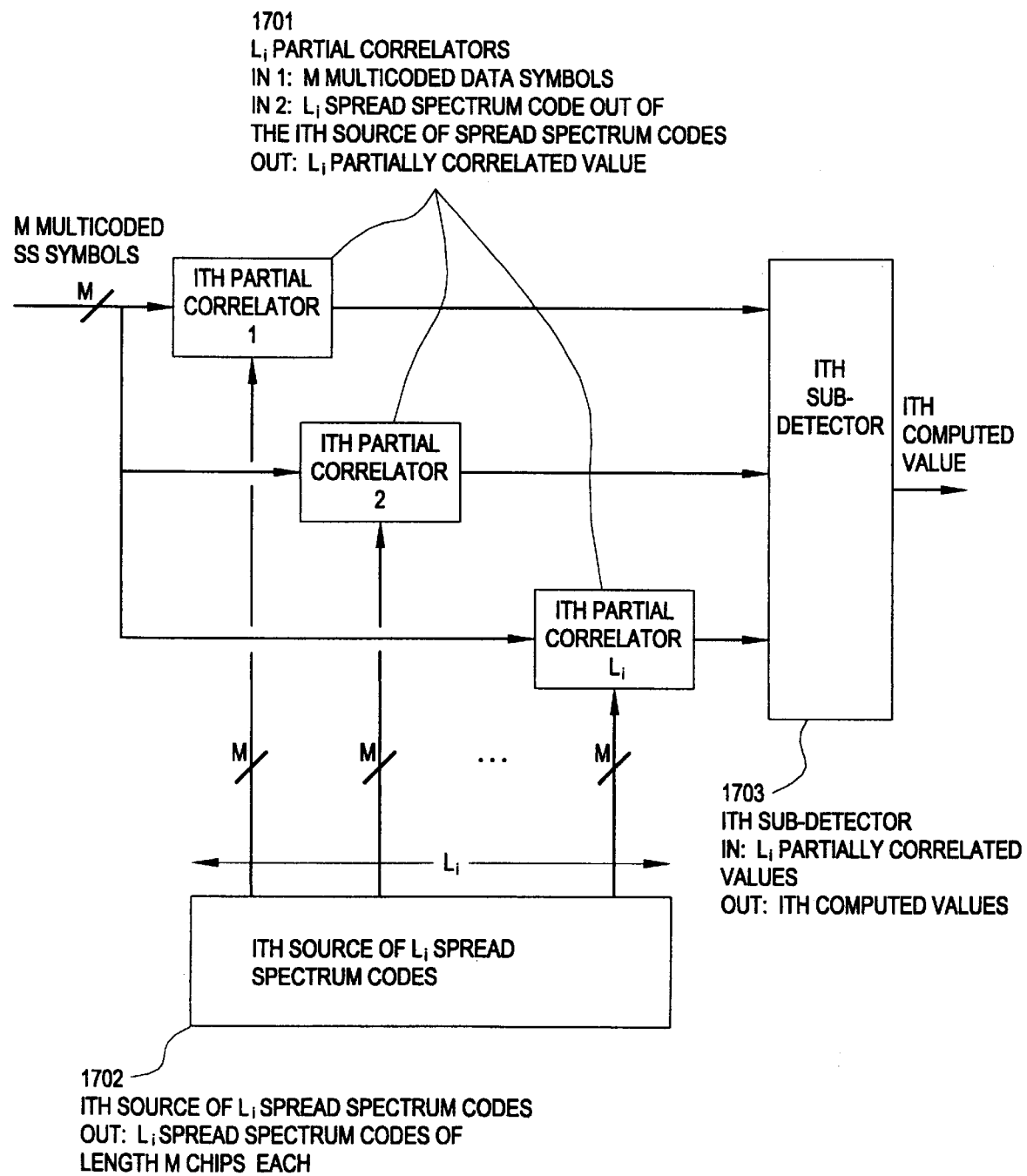
FIG. 17 provides a schematic of the ith computing means (1602) from FIG. 16, in which M multicoded SS symbols are input and ith computed values are output.

The set of N computing means (1602) in FIG. 16 is described further in FIG. 17 which displays only the ith computing mean where i=1, . . . ,N. The ith computing mean has as an input the M multicoded SS symbols, and as an output the ith computed value. FIG. 17 is described as follows.

The first block in FIG. 17 is a set of $L_i$ partial correlators (1701). The nth partial correlator has two inputs where n=1,2, . . . ,$L_i$. The first input consists of the M multicoded SS symbols and the second input consists of the nth spread spectrum code of length M chips out of the ith source of $L_i$ spread spectrum codes. The output of the nth partial correlator is the nth partially correlated value obtained by correlating parts of the first input with the corresponding parts of the second input.

The second block is the ith source (1702) of $L_i$ spread spectrum codes with an output of $L_i$ spread spectrum codes of length M chips each.

The third block is the ith sub-detector (1703) with an input of $L_i$ partially correlated values and an output of the ith computed value. The ith sub-detector has two tasks. First using the $L_i$ partially correlated values it has to obtain the full correlation between the M multicoded SS symbols and each one of the $L_i$ spread spectrum codes of length M chips obtained from the ith source (1702). Then, it has to select the spread spectrum code corresponding to the largest correlation. Such a detected spread spectrum code together with the corresponding full correlation value form the ith computed value.

The detector (1703) in FIG. 16 takes all the computed values from each one of the N computing means and outputs J despread symbols. Based on the function of each sub-detector, one can say that the detector (1603) has two tasks at hand. First, it has to map each detected spread spectrum code into a first set of despread symbols, then it has to map each full correlation value into a second set of despread symbols. In other words, the first set of despread symbols correspond to spread spectrum codes that form a subset of the spread spectrum codes corresponding to the second set of despread symbols.

It is also possible to have several layers of sub-detectors completing different levels of partial correlations and ending with N spread spectrum codes corresponding to the largest full correlation values per computing means. In this case, the tasks of the detector are first to map each detected spread spectrum code (obtained through the several layers of sub-detection) into sets of despread symbols, then to map each full correlation value into a final set of despread symbols.

Description of the Receiver for MCSS Type II

FIG. 15 illustrates a block diagram of the receiver for MCSS Type II with an input of PM multicoded SS symbols every $PMT_C$ seconds and an output of VB estimated data symbols every VBT seconds. FIG. 15 illustrates also the block diagram of the receiver for MCSS Type I and has been described above.

Figure 18:
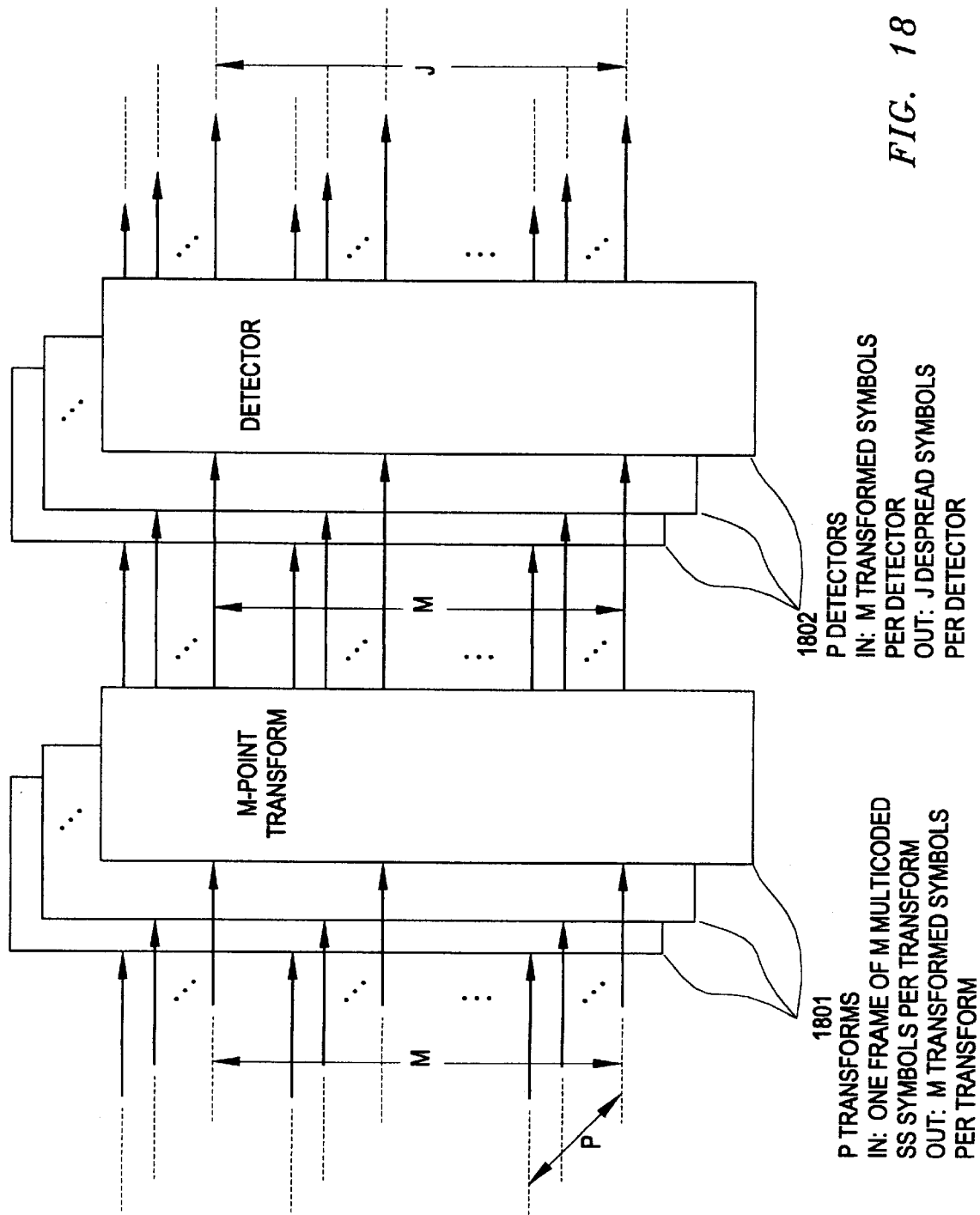
FIG. 18 provides a schematic of the Despreader Type II (1503) from FIG. 15, in which P frames of M multicoded SS symbols each are input and P frames of J despread symbols each are output.

The despreader type II (1504) in FIG. 15 is described further in FIG. 18 with an input of P frames of M multicoded SS symbols each, and an output of P frames of J despread symbols each. FIG. 18 is described as follows:

The first block in FIG. 18 is a set of P M-point transforms (1801) with an input of one frame of M multicoded SS symbols per transformer, and an output of M transformed symbols per transformer.

The second block is a set of P detectors (1802) with an input of M transformed symbols per detector, and an output of J despread symbols per detector. Once again the detector can either make soft decisions or hard decisions.

Description of the Receiver for MCSS Type III

Figure 19:
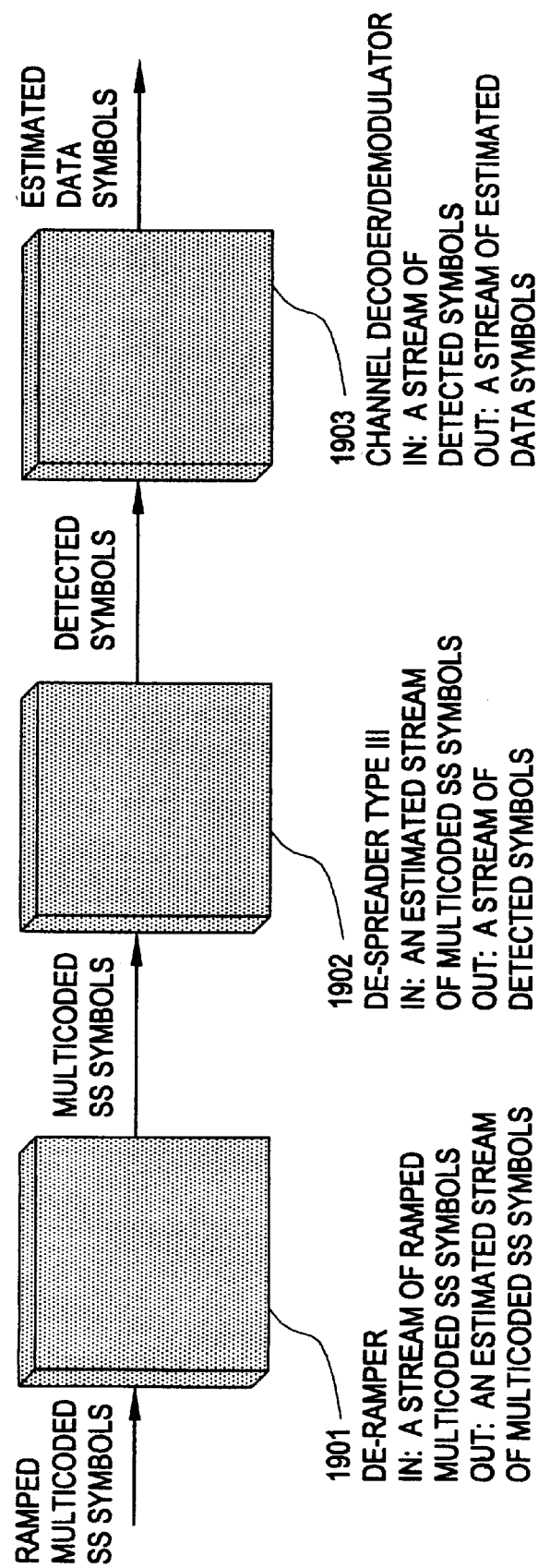
FIG. 19 provides a schematic of the Receiver for MCSS Type III, in which a stream of multicoded SS symbols are input and a stream of estimated data symbols are output.

FIG. 19 illustrates a block diagram of the receiver for MCSS Type III with an input of a stream of ramped multicoded SS symbols and an output of a stream of estimated data symbols. FIG. 19 is described as follows:

The first block in FIG. 19 is a de-ramper (1901) with an input of the stream of ramped multicoded SS symbols and an output of an estimated stream of multicoded SS symbols. The de-ramper is further described in FIG. 20.

The second block is a de-spreader Type III (1902) with an input of the estimated stream of multicoded SS symbols and an output of a stream of detected symbols. The de-spreader type II is further explained in FIG. 21–23.

The third block is a channel decoder/demodulator (1903) with the input consisting of the stream of detected symbols, and an output of a stream of estimated data symbols. It is clear from FIG. 19 that no de-interleaver is included in the receiver. As mentioned above, if an interleaver is added to the transmitter in FIG. 10, then FIG. 19 requires a de-interleaver.

Figure 20:
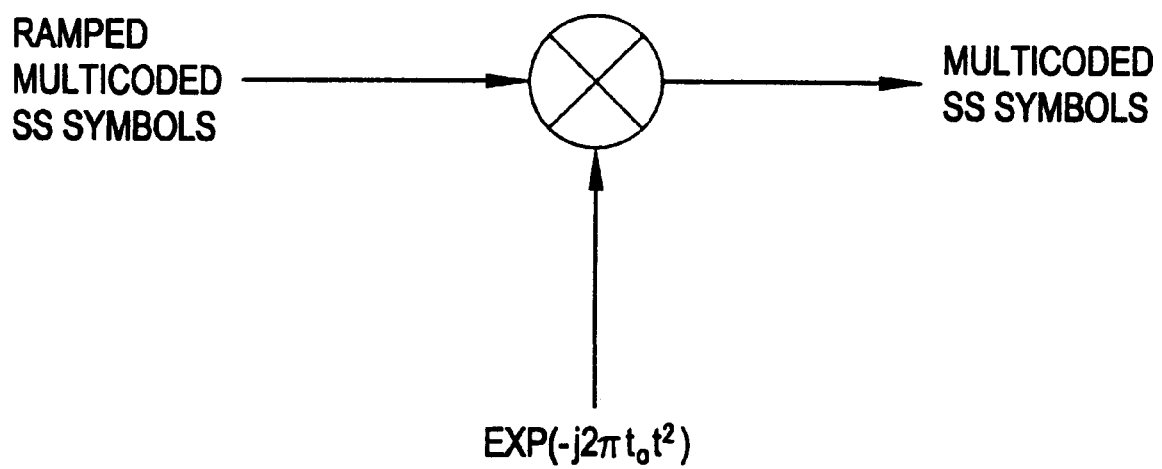
FIG. 20 provides the De-ramper (1901) in FIG. 19 for de-ramping the ramped milticoded SS symbols using a linearly de-ramping carrier frequency, in which a stream of ramped multicoded SS symbols are input and an estimated stream of multicoded SS symbols are output.

FIG. 20 illustrates the deramper (1901) in FIG. 19 as a mixer with two inputs and one output. The first input is the ramped multicoded SS symbols and the second input is a linearly ramping carrier frequency which deramps the ramped multicoded SS stream thereby generating an estimated stream of multicoded SS symbols.

Figure 21:
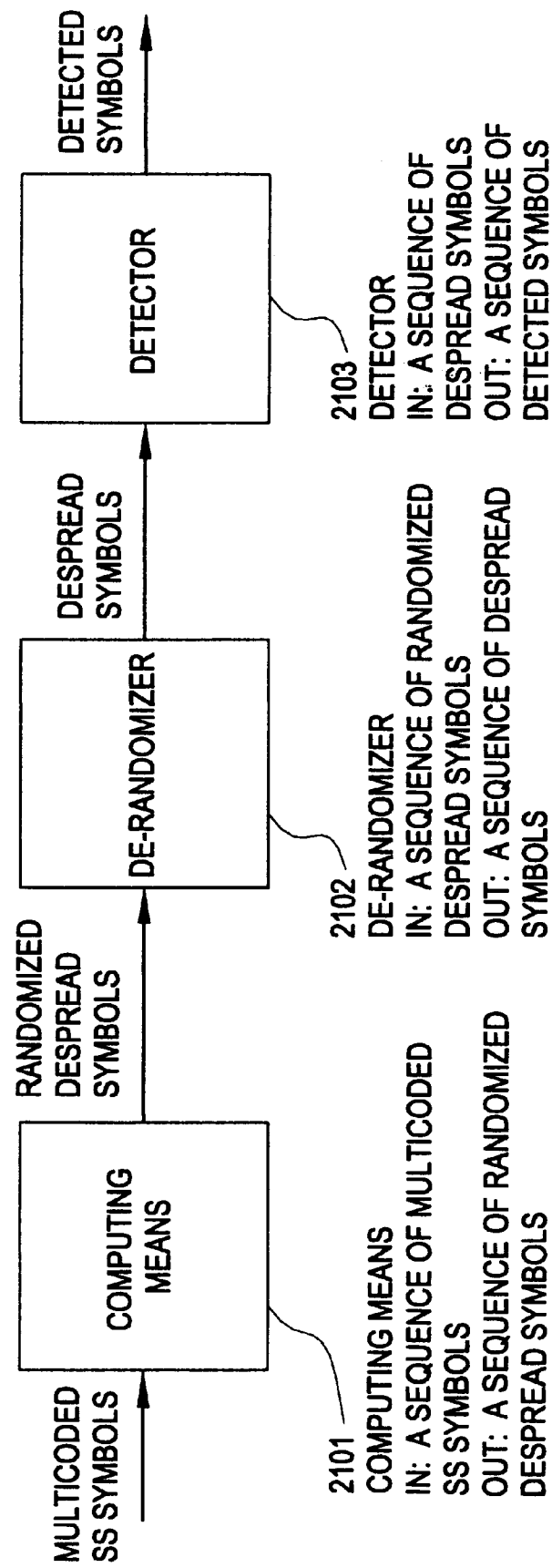
FIG. 21 provides a schematic of the De-Spreader (1902) Type III in FIG. 19, in which a sequence of multicoded SS symbols is input and a sequence of detected symbols is output.

The despreader type III (1902) in FIG. 19 is described further in FIG. 21 as three blocks.

Figure 22:
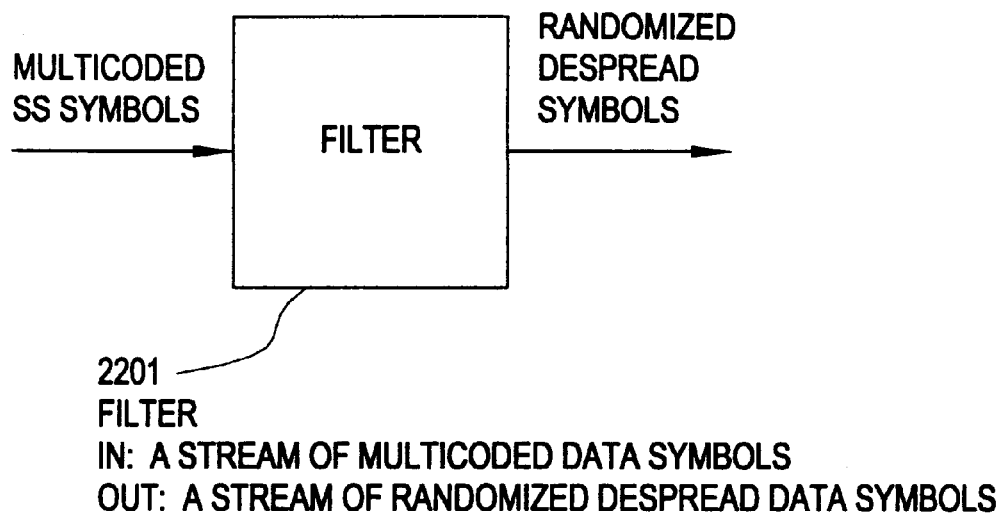
FIG. 22 provides a schematic of the computing means (2101) in FIG. 21, in which a stream of multicoded SS symbols is input and a stream of randomized despread symbols is output.

The first block is a computing means (2101) with an input of an estimated stream of multicoded SS symbols and an output of a stream of randomized despread symbols. FIG. 22 describes the computing means (2101) in FIG. 21 as a filter (2201) which performs the despreading process.

The second block is a de-randomizer (2102) with an input of a stream of randomized despread symbols and an output of a stream of despread symbols. The de-randomizer (2102) is described further in FIG. 23.

The third block is a detector (2103) with an input of a stream of despread symbols and an output of a stream of detected symbols. When the detector is a hard-decision detector it makes a decision on the despread symbols such that the detected values takes a finite number of values out of a predetermined alphabet of finite size. When the detector is a soft-decision detector the detected symbols are the same as the despread symbols.

Figure 23:
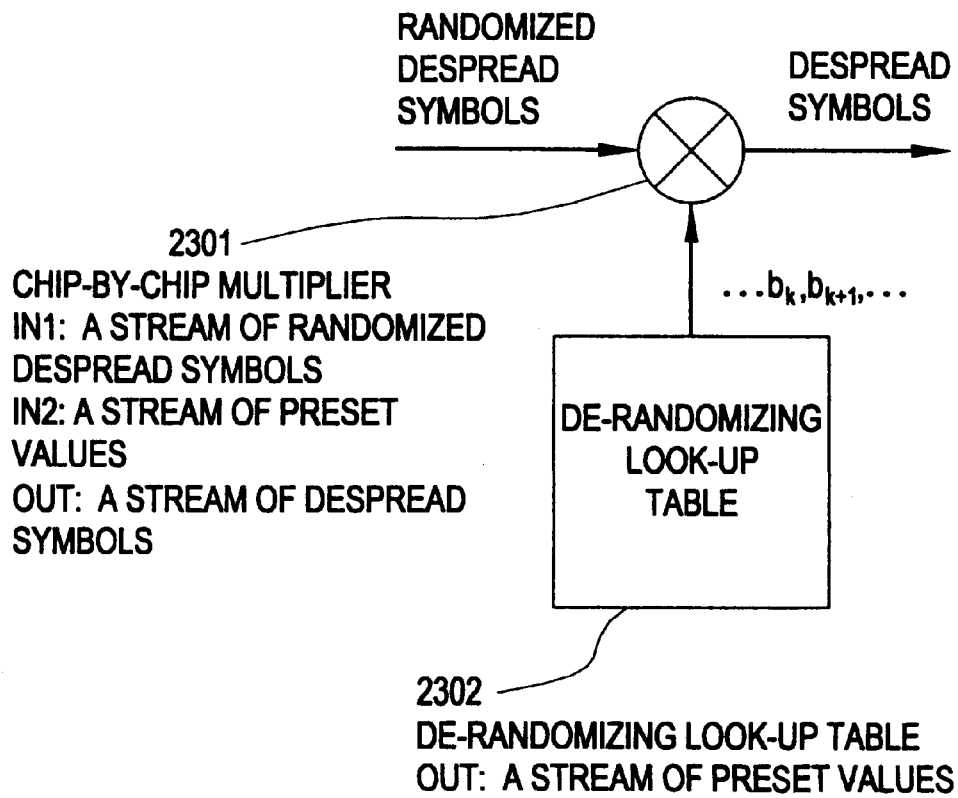
FIG. 23 provides a schematic of the De-Randomizer (2102) in FIG. 21, in which a sequence of randomized despread data symbols is input and a sequence of despread symbols is output.

The de-randomizer (2102) is described further in FIG. 23 as two parts.

The first part is a chip-by-chip multiplier (2301) with two inputs and an output. The first input is a stream of randomized despread data symbols and the second input is a stream of preset values output from a de-randomizing lookup table (2302). The output is the chip-by-chip product between the two inputs, i.e. the kth despread symbol is obtained as the product between the kth randomized despread symbol and the kth preset value $b_k$.

The second part is a de-randomizing lookup table (2302) which outputs a stream of preset values: ...,$b_k,b_{k+1}$,...

PREFERRED EMBODIMENTS OF THE INVENTION

From the above description of the invention, it is clear that the contribution of the invention is primarily in the spreader in the transmitter and in the despreader in the receiver for each one of the three type of MCSS introduced in the patent. The secondary contribution of the patent resides in the channel encoder/modulator and in the extra components that can be used in both the transmitter and in the receiver for each three types such as: the ramping and de-ramping of the signal and diversity techniques. For these reasons, we have separated the preferred embodiments of the invention into three parts. Each part corresponds to the spreader and the despreader for each one of the three types of MCSS and its extras.

Preferred Embodiments of the Spreader/Despreader for MCSS Type I

In FIG. 1, the spreader Type I (104) performs an invertible randomized spreading of the modulated symbols which carry either digital information or analog information, and in FIG. 15 the despreader Type I (1503) performs a reverse operation to the spreader Type I (104) within the limits of available precision (i.e. with some level of quantization noise).

In FIG. 1, the spreader Type I (104) performs an invertible randomized spreading of the modulated, and in FIG. 15 the despreader Type I (1503) performs a reverse operation to the spreader Type I (104) while taking into account the effects of the communications channel such as noise, distortion and interference. The effects of the channel are sometimes unknown to the receiver (e.g. over selective fading channels which cause intersymbol interference). In such cases, the channel has to be estimated using for example a pilot signal known to the receiver as in "MultiCode Direct Sequence Spread Spectrum," by M. Fattouche and H. Zaghloul, U.S. Pat. No. 5,555,268, September 1996.

In FIG. 2, if $J_k=0$ for any k=1, . . . ,N then the output of the kth computing means is the all zeros spread spectrum codes of length M chips.

In FIG. 2, if the modulated symbols are M-ary symbols, then a preferred value for $L_i$ is M to the power of $J_i$. In other words, by choosing one spread spectrum code out of $L_i$ codes, $J_i$ symbols of information are conveyed.

In FIG. 3, a preferred function for the ith mapper is to choose one spread spectrum code (out of the $L_i$ available codes) based on one part of the ith subset of $J_i$ modulated symbols while the second part of the subset is used to choose the symbol that multiplies the chosen spread spectrum code. In other words, assuming that the kth spread spectrum code $S_k$ is chosen by the ith mapper (301) (out of the $L_i$ available codes) based on the first part of the ith subset of $J_i$ modulated symbols and that the symbol $\zeta$ is chosen to multiply $S_k$ based on the second part of the ith subset of $J_i$ modulated symbols, then the ith spread spectrum symbol out of the ith mapper (301) is $S^k\zeta$. This is equivalent to spreading $\zeta$ over $S_k$.

In FIG. 3, $\zeta$ can be chosen as a DBPSK symbol, a DQPSK symbol, a DMPSK symbol, a QAM symbol, a FSK symbol, a CPM symbol, an ASK symbol, etc.

In FIG. 3, the $L_i$ spread spectrum codes, out of the ith source (302) of $L_i$ available spread spectrum codes, correspond to Walsh codes. Each Walsh code in FIG. 3 is generated in FIG. 4 as the output of an M-point Walsh transform where the input is a preset sequence of length M chips with (M−1) chips taking a zero value while one chip taking a unity value.

In FIG. 3, the $L_i$ spread spectrum codes, out of the ith source (302) of $L_i$ available spread spectrum codes, correspond to randomized Walsh codes. Each Walsh code generated in FIG. 4 as the output of an M-point Walsh transform is randomized in FIG. 5 using a chip-by-chip multiplier where the kth chip of each Walsh code is multiplied by the preset value $a_{k,i}$ output from the ith randomizing lookup table.

In FIG. 5, them preset values $\{a_{1,i}, a_{2,i}, \ldots, a_{M,i}\}$ are chosen such that their amplitudes: $|a_{1,i}|, |a_{2,i}|, \ldots, |a_{M,i}|$ are all equal to unity.

In FIG. 3, a preferred value for $L_i$ is 2 and a preferred value for M is 10 with the two preferred spread spectrum codes out of the ith source (302) taking the values:

$$\{c_1, c_2, c_3, c_4, c_5, c_6, c_7, c_8, c_9, c_{10}\}$$

and $$\{c_1, c_2, c_3, c_4, c_5, -c_6, -c_7, -c_8, -c_9, -c_{10}\} \quad (1)$$

In equation (1), preferred values for the chips '$c_1, c_2, c_3, c_4, c_5, c_6, c_7, c_8, c_9, c_{10}$' are '1,−1,1,1,1,j,−j,j,j,j' which we refer to as the 'Wi-LAN codes Type I'.

Preferred Embodiments of the Spreader/Despreader for MCSS Type II

In FIG. 6, the spreader Type II (604) performs an invertible randomized spreading of the modulated symbols which carry either digital information or analog information, and in FIG. 15 the despreader Type II (1503) performs a reverse operation to the spreader Type II (604) within the limits of available precision (i.e. with some level of quantization noise).

In FIG. 6, the spreader Type II (604) performs an invertible randomized spreading of the modulated, and in FIG. 15 the despreader Type II (1503) performs a reverse operation to the spreader Type II (604) while taking into account the effects of the communications channel such as noise, distortion and interference. As mentioned above, the effects of the channel are sometimes unknown to the receiver (e.g. over selective fading channels which cause intersymbol interference). In such cases, the channel has to be estimated using for example a pilot signal known to the receiver as in "MultiCode Direct Sequence Spread Spectrum," by M. Fattouche and H. Zaghloul, U.S. Pat. No. 5,555,268, September 1996.

Two preferred types of pilot signals can be used to estimate the effects of the channel on the information-bearing data symbols:

1. Pilot Frames inserted either before, during or after the Data frames of M multicoded SS symbols; and
2. Pilot Symbols inserted within each data frame of M multicoded SS symbols.

Pilot frames estimate the long term effects of the channel, while pilot symbols estimate the short term effects of the channel.

When channel estimation is used in the receiver as mentioned above, it is possible to use coherent detection with phase modulation, such as BPSK, QPSK and MPSK, after removing the effects of the channel from the phase of the received signal. On the other hand, if the effects of the channel are not removed, differential detection is selected instead with differentially-encoded phase modulation such as DPSK, DQPSK and DMPSK.

Furthermore, when channel estimation is used in the receiver as mentioned above, it is possible to use amplitude modulation together with coherent detection of phase modulation, such as ASK and QAM, after removing the effects of the channel from the phase and the amplitude of the received signal. On the other hand, if the effects of the channel are not removed, differential detection is selected instead with differentially-encoded phase and amplitude modulation such as Differential QAM using the star constellation.

A preferred modulation technique is QAM when the channel is estimated and its effects removed.

Another preferred modulation technique is DMPSK when the effects of the channel are not removed. In this case, a reference symbol is chosen at the beginning of each frame output from the channel modulator/modulator (603).

In FIG. 6, a preferred channel encoder/modulator (603) is a Reed-Solomon channel encoder used for encoding M-ary symbols and for correcting errors caused by the channel at the receiver. If the data symbols are binary, it is preferred to choose to combine several input bits into one symbol prior to encoding. A preferred technique to combine several bits into one symbol is to combine bits that share the same position within a number of consecutive frames. For example, the kth bit in the nth frame can be combined with the kth bit in the (n+1)th frame to form a dibit, where k=1, . . . ,Q.

In FIG. 6, if the data symbols are M-ary, a preferred value for B is unity when using a Reed-Solomon encoder, i.e. no interleaver is required in this case.

In FIG. 7, preferred values for $J_1, J_2, \ldots, J_M$ are unity.

In FIG. 8, preferred values for $\{a_{1,i}, a_{2,i}, \ldots, a_{M,i}\}$ are such that their amplitudes: $|a_{1,i}|, |a_{2,i}|, \ldots, |a_{M,i}|$ are all equal to unity.

In FIG. 9, preferred ith second M-point transform (902) is a Discrete Fourier Transform (DFT).

When $J_1 = J_2 = \ldots = J_M = 1$, $|a_{1,i}| = |a_{2,i}| = \ldots = |a_{M,i}| = 1$ and the ith second M-point transform is a DFF, the MCSS transmitter is similar to the one in the issued patent: "Method and Apparatus for Multiple Access between Transceivers in Wireless Communications using OFDM Spread Spectrum," by M. Fattouche and H. Zaghloul, U.S. Pat. No. 5,282,222, Jan. 25, 1994.

The generated spread spectrum codes using $$J_1 = J_2 = \ldots = J_M = 1,$$

$$|a_{1,i}| = |a_{2,i}| = \ldots = |a_{M,i}| = 1,$$

the ith second M-point transform as a DFT, and
the channel encoder as a Reed-Solomon encoder without an interleaver are referred to as the 'Wi-LAN codes Type II'.

Another preferred embodiment of the ith second M-point transform (902) is a Circular FIR (CFIR) filter of length M coefficients which performs an M-point circular convolution between each block of M modulated symbols and its own coefficients. In this case, a preferred embodiment of the M-point transform (1801) is also a CFIR filter of length M coefficients which performs the inverse operation of the spreading CFIR filter by performing an M-point circular convolution between each block of M multicoded SS symbols and its own coefficients. When the channel is estimated, the despreading CFIR filter can also invert the effects of the channel using either
1. a linear algorithm such as Zero Forcing Equalization (ZFE) and Minimum Mean Square Equalization (MMSE); or
2. a nonlinear algorithm such as Decision Feedback Equalization (DFE) and Maximum Likelihood (ML).

The effect of a nonideal frequency-selective communication channel is to cause the multicodes to loose their orthogonality at the receiver. In the case when ZFE is employed, the CFIR filter acts as a decorrelating filter which decorrelates the M multicoded symbols from one another at the receiver thereby forcing the symbols to be orthogonal.

An advantage of using CFIR filter for spreading and despreading the data symbols is that IF-sampling can be inherently employed in the MCSS receiver without increasing the complexity of the digital portion of the receiver since interpolation and decimation filters can be included in the CFIR filters.

Preferred Embodiments of the Spreader/Despreader for MCSS Type III

In FIG. 10, the spreader Type III (1002) performs an invertible randomized spreading of the stream of modulated symbols which carry either digital information or analog information, and in FIG. 19 the despreader Type I (1902) performs a reverse operation to the spreader Type III (1002) within the limits of available precision (i.e. with some level of quantization noise).

In FIG. 10, the spreader Type III (1002) performs an invertible randomized spreading of the stream of modulated symbols, and in FIG. 19 the despreader Type III (1902) performs a reverse operation to the spreader Type III (1002) while taking into account the effects of the communications channel such as noise, distortion and interference. As mentioned above, the effects of the channel are sometimes unknown to the receiver (e.g. over selective fading channels which cause intersymbol interference). In such cases, the channel has to be estimated using for example a pilot signal known to the receiver as in "MultiCode Direct Sequence Spread Spectrum," by M. Fattouche and H. Zaghloul, U.S. Pat. No. 5,555,268 September 1996.

A preferred randomizer (1101) in FIG. 11 is a trivial one with no effect on the modulated symbols.

Another preferred randomizer (1101) is one where the preset values out of the randomizing lookup table (1202): $\{\ldots, a_{k-1}, a_k, a_{k+1}, \ldots\}$ have amplitudes which are equal to unity.

In FIG. 13, a preferred filter is a Finite Impulse Response (FIR) filter with the coefficients obtained as the values of a polyphase code.

In FIG. 13, a preferred filter is an FIR filter with the coefficients obtained as approximations to the values of a polyphase code.

In FIG. 13, a preferred filter is an FIR filter with the following 16 coefficients:

$$\{1,1,1,1,1,j,-1,-j,1,-1,1,-1,1,-j,-1,j\}$$

forming its impulse response where $j=\sqrt{-1}$. The 16 coefficients correspond to the following polyphase code:

$$\{e^{j0\theta(0)}, e^{j1\theta(0)}, e^{j2\theta(0)}, e^{j3\theta(0)}, e^{j0\theta(1)}, e^{j1\theta(1)}, e^{j2\theta(1)}, e^{j3\theta(1)}, e^{j0\theta(2)}, e^{j\theta(2)},$$
$$e^{j2\theta(2)}, e^{j3\theta(2)}, e^{j0\theta(3)}, e^{j\theta(3)}, e^{j2\theta(3)}, e^{j3\theta(3)}\}$$

where $\theta(0)=0$, $\theta(1)=2\pi/4$, $\theta(2)=4\pi/4$, $\theta(3)=6\pi/4$, and $j=\sqrt{-1}$.

In FIG. 13, another preferred filter is an FIR filter with 64 coefficients corresponding to the following polyphase code:

$$\{e^{j0\theta(0)}, e^{j1\theta(0)}, e^{j2\theta(0)}, e^{j3\theta(0)}, e^{j4\theta(0)}, e^{j5\theta(0)}, e^{j6\theta(0)}, e^{j7\theta(0)}, e^{j0\theta(1)}, e^{j1\theta(1)},$$
$$e^{j2\theta(1)}, e^{j3\theta(1)}, e^{j4\theta(1)}, e^{j5\theta(1)}, e^{j6\theta(1)},$$

$$e^{j7\theta(1)}, e^{j0\theta(2)}, e^{j1\theta(2)}, e^{j2\theta(2)}, e^{j3\theta(2)}, e^{j4\theta(2)}, e^{j5\theta(2)}, e^{j6\theta(2)}, e^{j7\theta(2)}, e^{j0\theta(3)},$$
$$e^{j1\theta(3)}, e^{j2\theta(3)}, e^{j3\theta(3)}, e^{j4\theta(3)}, e^{j5\theta(3)}, e^{j6\theta(3)},$$

$e^{j7\theta(3)}, e^{j0\theta(4)}, e^{j1\theta(4)}, e^{j2\theta(4)}, e^{j3\theta(4)}, e^{j4\theta(4)}, e^{j5\theta(4)}, e^{j6\theta(4)}, e^{j7\theta(4)}, e^{j0\theta(5)},$
$e^{j1\theta(5)}, e^{j2\theta(5)}, e^{j3\theta(5)}, e^{j4\theta(5)}, e^{j5\theta(5)}, e^{j6\theta(5)},$
$e^{j7\theta(5)}, e^{j0\theta(6)}, e^{j1\theta(6)}, e^{j2\theta(6)}, e^{j3\theta(6)}, e^{j4\theta(6)}, e^{j5\theta(6)}, e^{j6\theta(6)},$
$e^{j7\theta(6)}, e^{j0\theta(7)}, e^{j1\theta(7)}, e^{j2\theta(7)}, e^{j3\theta(7)}, e^{j4\theta(7)} e^{j5\theta(7)}, e^{j6\theta(7)}, e^{j7\theta(7)}\}$ where $\theta(0)=0$, $\theta(1)=2\pi/8$, $\theta(2)=4\pi/8$, $\theta(3)=6\pi/8$, $\theta(4)=8\pi/8$, $\theta(5)=10\pi/8$, $\theta(6)=12\pi/8$, $\theta(7)=14\pi/8$, and $j=\sqrt{-1}$.

In general, a preferred filter in FIG. 13 with M coefficients corresponding to a polyphase code can be obtained as the concatenation of the rows of an $\sqrt{M} \times \sqrt{M}$ matrix (assuming $\sqrt{M}$ is an integer) with the coefficient in the ith row and kth column equal to $e^{j(i-1)\theta(k-1)}$ where $\theta(k)=2\pi k/\sqrt{M}$, and $j=\sqrt{-1}$.

Another preferred filter in FIG. 13 with M coefficients corresponding to a binary approximation of a polyphase code can be obtained as the concatenation of the rows of an $\sqrt{M} \times \sqrt{M}$ matrix with the coefficient in the ith row and kth column determined as follows:

when $(i-1)\theta(k-1)$ is an integer number of $\pi/2$, the coefficient is equal to $e^{j(i-1)\theta(k-1)}$ where $\theta(k)=2\pi k/\sqrt{M}$, otherwise when $(i-1)\theta(k-1)$ is not an integer number of $\pi/2$, the coefficient is equal to $e^{jn\pi/2}$ where n is an integer number which minimizes the value: $(n\pi/2-(i-1)\theta(k-1))^2$.

We refer to the spread spectrum code corresponding to the coefficients of a filter representing a binary approximation of a polyphase code as discussed above as the 'Wi-LAN code Type III'.

For example when M=64, the above procedure produces the following filter coefficients:

{1,1,1,1,1,1,1,1,1,j,j,-1,-1,-j,-j,1,j,-1,-j,1,j,-1,-j,1,j,-1,-j, j,-1,1,-1,1,-1,1,-1,1,-1,1,-j,-j,-1,1,-j,j,1,-j,-1,-j,1,1,-j,-j,1,- j,-j,-1,-1,j,j,1}

A preferred filter in FIG. 21 performs a reverse operation to the filter (1301) in FIG. 13.

Another preferred filter in FIG. 21 performs a matching filtering operation to the filter (1301) in FIG. 13.

A preferred de-randomizer (2102) in FIG. 21 is one where the preset values out of the de-randomizing lookup table (2302): { ... ,$b_{k-1},b_k,b_{k+1}$, ... } performs a reverse operation to the randomizer (1101) in FIG. 11.

Another preferred de-randomizer (2102) in FIG. 21 is one where the preset values out of the de-randomizing lookup table (2302): { ... ,$b_{k-1},b_k,b_{k+1}$, ... } are equal to the reciprocal of the preset values out of the randomizing lookup table (1202) in FIG. 12, i.e. $b_k=1/a_k$ for all values of k.

Figure 24:
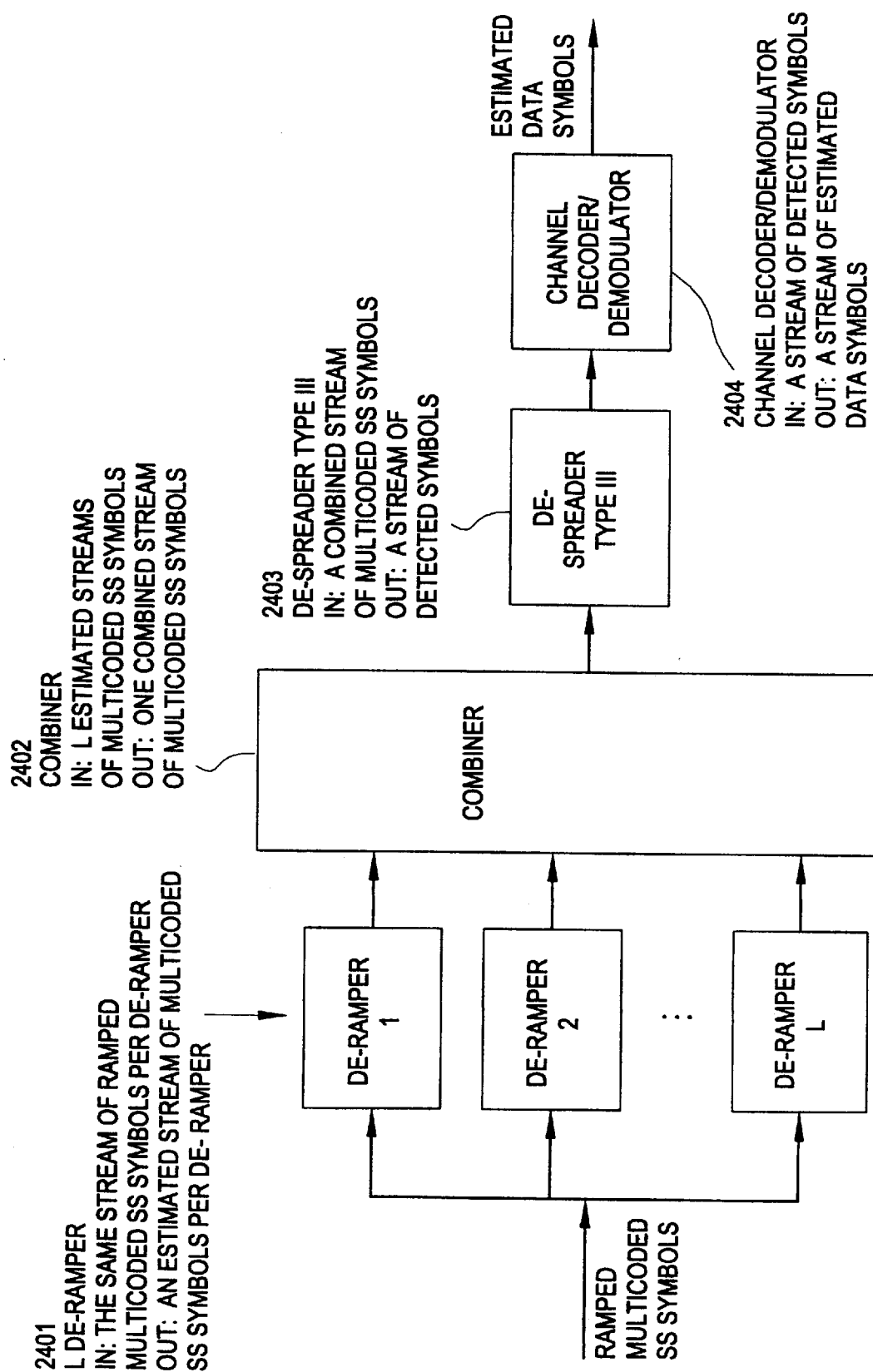
FIG. 24 provides a preferred diversity receiver for MCSS Type III with de-ramping, in which a stream of ramped multicoded SS symbols is input and a stream of estimated data symbols is output.

A preferred diversity technique for MCSS Type III is shown in FIG. 24 where we have L branches with one de-ramper (2401) per branch. Each de-ramper linearly de-ramps the received signal using a linearly deramping carrier frequency of fixed slope and unique intercept. Each intercept corresponds to a unique time of arrival of the different multipath components. The outputs of the L de-rampers are then combined in the combiner (2402) using any appropriate combining technique such as: co-phasing combining, maximum ratio combining, selection combining, equal gain combining, etc. The output of the combiner is then despread using the de-spreader (2403) and input into the channel decoder/demodulator (2404) to generate the estimated data symbols.

A preferred value for $f_o$ in FIG. 14 is $1/(2\tau M T_C)$ where $\tau$ is the relative delay between the first arriving radio signal and the second arriving radio signal at the receiver, M is the number of coefficients in the spreading filter (1301) in FIG. 13 and $T_C$ is the duration of one chip (or equivalently it is the unit delay in the spreading filter (1301)). In other words, the symbol rate at both the input and the output of the spreading filter (1301) is $1/T_C$.

The entire disclosure of U.S. Pat. No. 5,282,222 issued Jan. 25, 1994, and U.S. Pat. No. 5,555,268 issued Sep. 10, 1996, are hereby incorporated by reference in their entirety in this patent document.

A person skilled in the art could make immaterial modifications to the invention described in this patent document without departing from the essence of the invention that is intended to be covered by the scope of the claims that follow.

We claim:

1. A transceiver for transmitting a first stream of data symbols, the transceiver comprising:

a first converter for converting the first stream of data symbols into plural sets of B data symbols each;

a channel encoder/modulator for encoding the plural sets of B data symbols into plural sets of J modulated symbols;

a spreader for spreading the plural sets of J modulated symbols into plural sets of N spread spectrum symbols of length M chips each;

M combiners for combining each set of the plural sets of N spread spectrum symbols into M multicoded SS symbols; and a second converter for converting the plural sets of M multicoded SS symbols into a first stream of multicoded SS symbols for transmission.

2. The transceiver if claim 1 in which the spreader includes:

a third converter for converting each one of the plural sets of J modulated symbols into N subsets of modulated symbols; and a set of N computing means for operating on each one of the N subsets of modulated symbols to produce the N spread spectrum symbols whereby an ith set of computing means operates on an ith subset of modulated symbols to produce an ith spread spectrum symbol.

3. The transceiver of claim 2 in which the ith computing means includes:

a source of available spread spectrum codes; and a modulator to choose for each ith subset of modulated symbols one spread spectrum code from the source of available spread spectrum codes to become the spread spectrum code representing the ith subset of modulated symbols, thereby spreading each subset of modulated symbols over a separate spread spectrum code.

4. The transceiver of claim 3 in which the spread spectrum codes are generated by operation of a non-trivial transform on a sequence of input signals.

5. The transceiver of claim 4 in which the non-trivial transform consists of either a Walsh transform or a Fourier transform followed by a randomizing transform.

6. The transceiver of claim 3 further including:

means for receiving a sequence of multicoded SS symbols, the multicoded SS symbols having been generated by spreading a second stream of data symbols;

a third converter for converting the received stream of multicoded SS symbols into plural sets of M multicoded SS symbols each;

a despreader for despreading plural sets of M multicoded SS symbols to produce plural sets of J despread symbols;

a channel decoder/demodulator for decoding plural sets of J despread symbols into plural sets of B estimated data symbols of the second stream of data symbols; and a fourth converter for converting the plural sets of the B estimated data symbols into a stream of estimated data symbols of the second stream of data symbols.

7. The transceiver of claim 6 in which the despreader includes:

a set of N computing means to operate on the set of M multicoded SS symbols, from the received sequence of multicoded SS symbols, to generate a set of N computed values; and a detector for operating on the set of N computed values to generate a set of J despread symbols.

8. The transceiver of claim 7 in which the ith computing means includes:

a set of partial correlators for partially correlating the set of M multicoded SS symbol with corresponding parts of each spread spectrum code from the ith source of available spread spectrum codes to generate partially correlated values; and a sub-detector for operating on the partially correlated values to produce the ith computed value.

9. The transceiver of claim 1 in which the spreader is based on Wi-LAN codes Type I.

10. A transceiver for transmitting a first stream of data symbols, the transceiver comprising:

a first converter for converting the first stream of data symbols into plural sets of B data symbols each;

a channel encoder/modulator for encoding plural sets of B data symbols into plural sets of J modulated symbols;

a spreader for spreading plural sets of J modulated symbols into plural sets of M multicoded SS symbols; and a second converter for converting the plural sets of M multicoded SS symbols into a first stream of multicoded SS symbols for transmission.

11. The transceiver of claim 10 in which the spreader includes:

a third converter for converting each one of the plural sets of J modulated symbols into M subsets of modulated symbols; and a transformer for operating on the M subsets of modulated symbols to generate M multicoded SS symbols as output, the M multicoded SS symbols corresponding to spreading each subset of modulated symbol over a separate spread spectrum symbol and combining the M spread spectrum symbols.

12. The transceiver of claim 11 in which the transformer effectively applies a first transform corresponding to a randomizing transform of the M data symbols.

13. The transceiver of claim 12 in which the first transform is followed by a second transform corresponding to a Fourier transform.

14. The transceiver of claim 10 in which the channel encoder/modulator includes a Reed-Solomon encoder.

15. The transceiver of claim 10 in which the J modulated symbols contain a number of pilot symbols.

16. The transceiver of claim 10 in which plural sets of M multicoded SS symbols correspond to plural sets of M pilot symbols.

17. The transceiver of claim 12 in which the first transform is followed by a second transform corresponding to a circular finite impulse response filter.

18. The transceiver of claim 11 further including:

means for receiving a sequence of multicoded SS symbols, the multicoded SS symbols having been generated by spreading a second stream of data symbols;

a third converter for converting the received stream of multicoded SS symbols into plural sets of M multicoded SS symbols each;

a despreader for despreading plural sets of M multicoded SS symbols to produce plural sets of J despread symbols;

a channel decoder/demodulator for decoding plural sets of J despread symbols into plural sets of B estimated data symbols of the second stream of data symbols; and a fourth converter for converting the plural sets of the B estimated data symbols into a stream of estimated data symbols of the second stream of data symbols.

19. The transceiver of claim 10 in which the spreader is based on Wi-LAN codes Type II.

20. A transceiver for transmitting a first stream of data symbols, the transceiver comprising:

a channel encoder/modulator for encoding the first stream of data symbols into a modulated stream; and a spreader for spreading the modulated stream into a multicoded SS stream corresponding to an invertible randomized spreading of the modulated stream.

21. The transceiver of claim 20 further including means to ramp the multicoded SS stream using a linearly ramping carrier frequency, thereby generating a stream of ramped multicoded SS symbols.

22. The transceiver of claim 20 in which the spreader comprises:

a randomizer for randomizing the modulated stream into a randomized modulated stream; and a filter for spreading the randomized modulated stream into a multicoded SS stream.

23. The transceiver of claim 22 in which the filter has a finite impulse response and the coefficients of the impulse response are chosen from a set of spread spectrum codes.

24. The transceiver of claim 23 in which the set of spread spectrum codes is the class of polyphase codes.

25. The transceiver of claim 23 in which the set of spread spectrum codes is the class of codes that represent a binary approximation of the polyphase codes.

26. The transceiver of claim 1, or claim 10, or claim 20 in which the spreader is wideband.

27. The transceiver of claim 20 further including:

means for receiving a stream of multicoded SS symbols, the multicoded SS symbols having been generated by encoding and invertible randomized spreading of a second stream of data symbols;

a despreader for despreading the received stream of multicoded SS symbols into a detected stream; and a channel decoder/demodulator for decoding the detected stream to produce an estimate of the second stream of data symbols.

28. The transceiver of claim 20 in which the spreader is based on Wi-LAN codes Type III.

29. A method of exchanging data streams between a plurality of transceivers, the method comprising the steps of:

converting a first stream of data symbols into plural sets of B data symbols each;

channel encoding plural sets of B data symbols into plural sets of J modulated symbols;

spreading plural sets of J modulated symbols into plural sets of N spread spectrum symbols of length M chips each;

combining each set of the plural sets of the N spread spectrum symbols into M multicoded SS symbols;

converting the plural sets of M multicoded SS symbols into a first stream of multicoded SS symbols for transmission; and transmitting the multicoded SS symbols from a first transceiver at a time when no other of the plurality of transceivers is transmitting.

30. The method of claim 29 in which spreading of plural sets of J modulated symbols into plural sets of N spread spectrum symbols includes the step of: converting each one of the plural sets of J data symbols into N subsets of data symbols.

31. The method of claim 30 in which spreading of plural sets of J modulated symbols into plural sets of N spread spectrum symbols further includes: choosing for each ith subset of modulated symbols one spread spectrum code from a number of available spread spectrum codes to become the spread spectrum symbol representing the ith subset of modulated symbols, thereby spreading each subset of modulated symbols over a separate spread spectrum code.

32. The method of claim 31 further including the steps of:
receiving, at a transceiver distinct from the first transceiver, the sequence of multicoded SS symbols;
converting the received stream of multicoded SS symbols into plural sets of M multicoded SS symbols each;
despreading plural sets of M multicoded SS symbols to produce plural sets of J despread symbols;
decoding plural sets of J despread symbols into plural sets of B estimated data symbols of the first stream of data symbols; and
converting the plural sets of the B estimated data symbols into a stream of estimated data symbols of the first stream of data symbols.

33. The method of claim 32 in which despreading the received sequence of multicoded SS symbols includes the steps of:
partially correlating each set of M multicoded SS symbols from the received sequence of multicoded SS symbols with corresponding parts of each spread spectrum code from the set of available spread spectrum codes;
operating on the partially correlated values through the use of a set of N sub-detectors to produce a set of N computed values; and
operating on the set of N computed values through the use of a detector to generate a set of J despread symbols.

34. The method of claim 29 in which spreading of plural sets of J modulated symbols into plural sets of N spread spectrum symbols is based on a filter with coefficients equal to Wi-LAN codes Type I.

35. A method of exchanging data streams between a plurality of transceivers, the method comprising the steps of:
converting a first stream of data symbols into plural sets of B data symbols each;
channel encoding plural sets of B data symbols into plural sets of J modulated symbols;
spreading plural sets of J modulated symbols into plural sets of M multicoded SS symbols;
converting the plural sets of M multicoded SS symbols into a first stream of multicoded SS symbols for transmission; and
transmitting the multicoded SS symbols from a first transceiver at a time when no other of the plurality of transceivers is transmitting.

36. The method of claim 35 in which spreading of plural sets of J modulated symbols into plural sets of M multicoded SS symbols further includes:
converting each one of the plural sets of J modulated symbols into M subsets of modulated symbols; and
transforming, by way of a transform, the M subsets of modulated symbols to generate M multicoded SS symbols as output, the M multicoded SS symbols corresponding to spreading each subset of modulated symbol over a separate spread spectrum symbol and combining the M spread spectrum symbols.

37. The method of claim 36 in which transforming the M subsets of modulated symbols includes applying to the M subsets of modulated symbols a randomizing transform and a Fourier transform.

38. The method of claim 36 in which transforming the M subsets of modulated symbols includes applying to the M subsets of modulated symbols a randomizing transform and a circular convolution.

39. The method of claim 36 further including the steps of:
receiving, at a transceiver distinct from the first transceiver, the sequence of multicoded SS symbols;
converting the received stream of multicoded SS symbols into plural sets of M multicoded SS symbols each;
despreading plural sets of M multicoded SS symbols to produce plural sets of J despread symbols;
decoding plural sets of J despread symbols into plural sets of B estimated data symbols of the first stream of data symbols; and
converting the plural sets of the B estimated data symbols into a stream of estimated data symbols of the first stream of data symbols .

40. The method of claim 35 in which spreading of plural sets of J modulated symbols into plural sets of N spread spectrum symbols is based on Wi-LAN codes Type II.

41. A method of exchanging data streams between a plurality of transceivers, the method comprising the steps of:
channel encoding a first stream of data symbols into a stream of modulated symbols; and
spreading the stream of modulated symbols to produce a multicoded SS stream corresponding to an invertible randomized spreading of the first modulated stream.

42. The method of claim 41 further including ramping the multicoded SS stream using a linearly ramping carrier frequency, thereby generating a stream of ramped multicoded SS symbols.

43. The method of claim 42 in which spreading the stream of modulated symbols to produce a multicoded SS stream comprises:
randomizing the modulated symbols, through the use of a randomizer to generate a stream of randomized modulated symbols; and
filtering the randomized modulated symbols, through the use of a filter to generate a stream of multicoded SS symbols.

44. The method of claim 29, or claim 35, or claim 41 in which spreading is wideband.

45. The method of claim 41 further including the steps of:
receiving, at a transceiver distinct from the first transceiver, the stream of multicoded SS symbols;
despreading the received stream of multicoded SS symbols to produce a detected stream; and
decoding the detected stream to produce an estimate of the first stream of data symbols.

46. The method of claim 42 in which spreading the stream of modulated symbols to produce a multicoded SS stream is based on a filter with coefficients equal to Wi-LAN codes Type III.

* * * * *

UNITED STATES PATENT AND TRADEMARK OFFICE
CERTIFICATE OF CORRECTION

PATENT NO. : 6,320,897 B1
DATED : November 20, 2001
INVENTOR(S) : M.T. Fattouche et al.

It is certified that error appears in the above-identified patent and that said Letters Patent is hereby corrected as shown below:

<u>Title page,</u>
Item [75], Inventors, "Michel T. Fattouche; Hatim Zaghloul; Paul R. Milligan; David L. Snell, all of Calgary (CA)" should read -- Michel T. Fattouche; Hatim Zaghloul; both of Calgary (CA) --

Item [56], References Cited, OTHER PUBLICATIONS, insert in appropriate order the following:
-- Bingham, J.A.C., "Multicarrier Modulation for Data Transmission: An Idea Whose Time Has Come", *IEEE Communications Magazine*, pp. 5-15, May 1990.
Spracklen, C.T. and C. Smythe, "The Application of Code Division Multiplexing Techniques to Local Area Networks," pp. 767-770, May 1987. --

Signed and Sealed this

Thirteenth Day of August, 2002

*Attest:*

JAMES E. ROGAN
*Attesting Officer*  *Director of the United States Patent and Trademark Office*